US010379196B2

(12) United States Patent
Aldana et al.

(10) Patent No.: US 10,379,196 B2
(45) Date of Patent: Aug. 13, 2019

(54) UNICAST AND BROADCAST PROTOCOL FOR WIRELESS LOCAL AREA NETWORK RANGING AND DIRECTION FINDING

(71) Applicant: QUALCOMM Incorporated, San Diego, CA (US)

(72) Inventors: Carlos Horacio Aldana, Mountain View, CA (US); Jeff Smith, San Jose, CA (US); Xiaoxin Zhang, Fremont, CA (US); Chia-Hui Lin, San Jose, CA (US); Yen-Feng Lee, San Jose, CA (US); Ravi Gidvani, Fremont, CA (US); Alecsander Eitan, Haifa (IL); Rahul Malik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/191,498

(22) Filed: Jun. 23, 2016

(65) Prior Publication Data
US 2017/0251332 A1 Aug. 31, 2017

Related U.S. Application Data

(60) Provisional application No. 62/300,879, filed on Feb. 28, 2016.

(51) Int. Cl.
*G01S 5/00* (2006.01)
*H04W 4/02* (2018.01)
(Continued)

(52) U.S. Cl.
CPC ............ *G01S 5/0009* (2013.01); *G01S 5/021* (2013.01); *G01S 5/0226* (2013.01); *H04W 4/02* (2013.01);
(Continued)

(58) Field of Classification Search
CPC ... H04W 8/005; H04W 16/28; H04W 72/046; H04W 76/023; H04W 16/225;
(Continued)

(56) References Cited

U.S. PATENT DOCUMENTS 9,634,811 B2 * 4/2017 Gong ................... H04L 5/0053
2006/0248429 A1 11/2006 Grandhi et al.
(Continued)

FOREIGN PATENT DOCUMENTS

WO   WO-2015130712 A1   9/2015

OTHER PUBLICATIONS

Heejung Yu and Taejoon Kim, Beamforming Transmission in IEEE 802.11ac Under Time-Varying Channels, The Scientific World Journal, Jul. 24, 2014, p. 4.*
(Continued)

*Primary Examiner* — George Eng
*Assistant Examiner* — Hung K Du
(74) *Attorney, Agent, or Firm* — Thien T. Nguyen

(57) ABSTRACT

Disclosed embodiments facilitate wireless channel calibration, ranging, and direction finding, between networked devices. A method on a first station (STA) may comprise: broadcasting, at a first time, a first NDPA frame to a plurality of second STAs. The first NDPA frame may include a first bit indicating that one or more subsequent frames comprise ranging or angular information. After a Short Interval Frame Space (SIFS) time interval from the first time, a second frame may be broadcast. The second frame may be a Null Data Packet (NDP) frame. In response, a plurality of Compressed Beamforming (CBF) frames may be received at the first STA where each CBF frame may be received from a distinct corresponding second STA, and may include Channel Feedback Information field with information pertaining to communication channel between the first STA and the corresponding second STA. The communications may be encoded using Orthogonal Frequency Division Multiple Access.

30 Claims, 26 Drawing Sheets

(51) Int. Cl.
*G01S 5/02* (2010.01)
*H04W 24/10* (2009.01)
*H04W 88/02* (2009.01)
*H04W 84/12* (2009.01)

(52) U.S. Cl.
CPC ............ *H04W 24/10* (2013.01); *H04W 84/12* (2013.01); *H04W 88/02* (2013.01)

(58) Field of Classification Search
CPC ... H04W 64/00; H04W 64/003; H04W 4/023; H04W 52/0216; H04W 4/02; H04W 24/10; H04W 88/02; H04W 84/12; H04B 7/0452; H04B 7/0617; G01S 5/0226; G01S 5/0009; G01S 1/08; G01S 5/021; G01S 5/0205; G01S 5/14
See application file for complete search history.

(56) References Cited

U.S. PATENT DOCUMENTS

| | | | |
|---|---|---|---|
| 2010/0271992 A1 | 10/2010 | Wentink et al. | |
| 2011/0069668 A1* | 3/2011 | Chion | H04L 1/1829 370/329 |
| 2011/0075607 A1 | 3/2011 | Kim et al. | |
| 2012/0026909 A1 | 2/2012 | Seok | |
| 2013/0188567 A1 | 7/2013 | Wang et al. | |
| 2014/0056205 A1* | 2/2014 | Aboul-Magd | H04W 72/0426 370/312 |
| 2014/0211703 A1 | 7/2014 | Seok et al. | |
| 2014/0301240 A1 | 10/2014 | Park et al. | |
| 2014/0301248 A1 | 10/2014 | Lindholm et al. | |
| 2014/0334420 A1 | 11/2014 | You et al. | |
| 2015/0043538 A1* | 2/2015 | Xu | H04W 36/0033 370/332 |
| 2015/0063128 A1 | 3/2015 | Garikipati et al. | |
| 2015/0094103 A1 | 4/2015 | Wang et al. | |
| 2015/0156794 A1 | 6/2015 | Kwon et al. | |
| 2015/0326409 A1 | 11/2015 | Kim et al. | |
| 2015/0365805 A1 | 12/2015 | Bajko et al. | |
| 2016/0119902 A1 | 4/2016 | Cheong et al. | |
| 2016/0134342 A1 | 5/2016 | Kneckt et al. | |
| 2016/0143026 A1 | 5/2016 | Seok et al. | |
| 2016/0165607 A1 | 6/2016 | Hedayat et al. | |
| 2016/0205501 A1* | 7/2016 | Lee | H04W 8/005 455/457 |
| 2016/0233932 A1* | 8/2016 | Hedayat | H04B 7/0421 |
| 2016/0330732 A1 | 11/2016 | Moon et al. | |
| 2016/0366548 A1* | 12/2016 | Wang | H04W 64/00 |
| 2017/0085306 A1 | 3/2017 | Cariou et al. | |
| 2017/0171766 A1 | 6/2017 | Amizur | |
| 2017/0195026 A1* | 7/2017 | Ghosh | H04B 7/0452 |
| 2017/0223665 A1* | 8/2017 | Chun | H04W 72/04 370/329 |
| 2017/0250831 A1 | 8/2017 | Aldana et al. | |
| 2017/0251449 A1 | 8/2017 | Malik et al. | |
| 2017/0339643 A1 | 11/2017 | Yang et al. | |
| 2018/0138959 A1 | 5/2018 | Chun et al. | |
| 2018/0176918 A1 | 6/2018 | Hedayat | |
| 2018/0184421 A1 | 6/2018 | Seok | |
| 2018/0212738 A1 | 7/2018 | Chun et al. | |
| 2018/0213424 A1 | 7/2018 | Du et al. | |

OTHER PUBLICATIONS

International Search Report and Written Opinion—PCT/US2017/015155—dated Apr. 7, 2017.

* cited by examiner

| Antenna Configuration | Packet Bandwidth | Byte Size |
|---|---|---|
| 4x4 | 20 | 2K |
| 4x4 | 40 | 4K |
| 4x4 | 80 | 8K |
| 4x4 | 160 | 16K |
| 8x8 | 160 | 64K |

FIG. 5C

| Nc Index 557 | Nr Index 567 | Channel Width 577 | Grouping 587 | Codebook Information 588 | Feedback Type 589 | Remaining Feedback Segments | First Feedback Segment | Reserved 586 | Sounding Dialog Token Number |
|---|---|---|---|---|---|---|---|---|---|
| B0 B2 B3 B5 B6 | | B7 B8 | B9 | B10 | B11 | B12 B14 | B15 | B16 B17 | B18 B23 |
| 3 | 3 | 2 | 2 | 1 | 1 | 3 | 1 | 2 | 6 |

Bits: 3

547

Figure 9-116—VHT MIMO Control field

Broadcast, at a first time, a first NDPA frame to a plurality of second stations (STAs), the first NDPA frame comprising a first bit indicating that one or more subsequent frames comprise ranging or angular information;

1520

Broadcast, after a Short Interval Frame Space (SIFS) time interval from the first time, a second frame to the plurality of second station (STAs), wherein the second frame is one of: a Null Data Packet az (NDP_az) frame with information about a time of transmission of the NDP_az frame, or a Null Data Packet (NDP) frame;

1530

Receive, at the first STA, in response to the second frame, a plurality of Compressed Beamforming (CBF) frames, wherein each CBF frame in the plurality of CBF frames is: received from a distinct corresponding second STA in the plurality of second STAs, and comprises a corresponding Channel Feedback Information (CFI) field with information pertaining to communication channel between the first STA and the corresponding second STA

FIG. 15

UNICAST AND BROADCAST PROTOCOL FOR WIRELESS LOCAL AREA NETWORK RANGING AND DIRECTION FINDING

CROSS REFERENCE TO RELATED APPLICATIONS

This application claims the benefit of and priority to U.S. Provisional Patent Application No. 62/300,879 entitled "Unicast and Broadcast Protocol for Wireless Local Area Network Ranging and Direction Finding," filed Feb. 28, 2016, which is assigned to the assignee hereof and incorporated by reference in its entirety herein.

FIELD

The subject matter disclosed herein relates to wireless communication and specifically to unicast, multicast, and/or broadcast protocols for sounding, ranging and/or direction finding in wireless communication systems.

BACKGROUND

It is often desirable to perform positioning functions on user equipment (UE) such as a mobile terminal, a cellular phone or other mobile device. The terms "location" and "position" are synonymous and are used interchangeably herein. For example, in wireless systems based on the IEEE 802.11 standard, positioning may be performed using Round Trip Time (RTT) measurements between an Access Point (AP) and User Equipment (UE), which may take the form of a mobile station, cell phone, wearable, handheld computing device, or some other user device.

In modern wireless systems, multiple antennas at the transmitter and receiver may be used to implement multiple input/multiple output (MIMO). MIMO facilitates parallel delivery of multiple spatially multiplexed data signals, which are referred to as multiple spatial streams. In addition, "beamforming" may be used for directional signal transmission or reception. In beamforming, elements in a phased array antenna are combined so that signals at some angles experience constructive interference, while others experience destructive interference, so that the beam may be "steered" in a desired direction. Beamforming can be used to achieve spatial selectivity at the transmitting and receiving ends. Techniques to facilitate beamforming calibration may therefore provide improved UE location determination and/or channel characterization.

SUMMARY

Disclosed embodiments facilitate information exchange between wireless STAs in part, by leveraging existing NDPA/NDP exchanges to send angular information for RTT determination purposes. Disclosed embodiments also facilitate information exchange between wireless STAs based, in part, on the use of CBF frames to transmit CFI. The CBF, NDP and/or NDPA frames above, may be used, in some embodiments, in a broadcast or multicast fashion. In some embodiments, BRP frames (e.g. used in 60 GHz) may be used with an NDPA/NDP framework to form a unified protocol Disclosed embodiments also facilitate symmetric RTT/AoA/AoD/Azimuth exchange In some embodiments, a method on a first station (STA) may comprise: broadcasting, at a first time, a first NDPA frame to a plurality of second stations (STAs), the first NDPA frame comprising a first bit indicating that one or more subsequent frames comprise ranging or angular information; broadcasting, after a Short Interval Frame Space (SIFS) time interval from the first time, a second frame to the plurality of second station (STAs). The second frame may be one of: a Null Data Packet az (NDP_az) frame with information about a time of transmission of the NDP_az frame, or a Null Data Packet (NDP) frame. Further, in some embodiments, a plurality of Compressed Beamforming (CBF) frames may be received at the first STA in response to the second frame. Each CBF frame in the plurality of CBF frames may be: received from a distinct corresponding second STA in the plurality of second STAs, and may comprise a corresponding Channel Feedback Information (CFI) field with information pertaining to communication channel between the first STA and the corresponding second STA.

In a further aspect, a first station (STA) may comprise: a memory, and a processor coupled to the memory, wherein the processor is configured to: broadcast, at a first time, a first NDPA frame to a plurality of second stations (STAs), the first NDPA frame comprising a first bit indicating that one or more subsequent frames comprise ranging or angular information. The processor may be further configured to: broadcast, after a Short Interval Frame Space (SIFS) time interval from the first time, a second frame to the plurality of second station (STAs), wherein the second frame is one of: a Null Data Packet az (NDP_az) frame with information about a time of transmission of the NDP_az frame, or a Null Data Packet (NDP) frame; and receive, at the first STA, in response to the second frame, a plurality of Compressed Beamforming (CBF) frames. Each CBF frame in the plurality of CBF frames may be: received from a distinct corresponding second STA in the plurality of second STAs, and comprise a corresponding Channel Feedback Information (CFI) field with information pertaining to communication channel between the first STA and the corresponding second STA.

Disclosed embodiments also pertain to a first station (STA) comprising: means for broadcasting, at a first time, a first NDPA frame to a plurality of second stations (STAs), the first NDPA frame comprising a first bit indicating that one or more subsequent frames comprise ranging or angular information; means for broadcasting, after a Short Interval Frame Space (SIFS) time interval from the first time, a second frame to the plurality of second station (STAs). The second frame may be one of: a Null Data Packet az (NDP_az) frame with information about a time of transmission of the NDP_az frame, or a Null Data Packet (NDP) frame. The first STA may further comprise: means for receiving, at the first STA, in response to the second frame, a plurality of Compressed Beamforming (CBF) frames. Each CBF frame in the plurality of CBF frames may be: received from a distinct corresponding second STA in the plurality of second STAs, and comprise a corresponding Channel Feedback Information (CFI) field with information pertaining to communication channel between the first STA and the corresponding second STA.

In another aspect a non-transitory computer-readable medium may comprise program code executable by a processor to: broadcast, at a first time, a first NDPA frame to a plurality of second stations (STAs), the first NDPA frame comprising a first bit indicating that one or more subsequent frames comprise ranging or angular information; broadcast, after a Short Interval Frame Space (SIFS) time interval from the first time, a second frame to the plurality of second station (STAs). The second frame may be one of: a Null Data Packet az (NDP_az) frame with information about a time of transmission of the NDP_az frame, or a Null Data Packet (NDP) frame. The medium may further comprise code executable by the processor to receive, at the first STA, in response to the second frame, a plurality of Compressed Beamforming (CBF) frames. Each CBF frame in the plurality of CBF frames may be: received from a distinct corresponding second STA in the plurality of second STAs, and comprise a corresponding Channel Feedback Information (CFI) field with information pertaining to communication channel between the first STA and the corresponding second STA.

The methods disclosed may be performed by one or more of APs, non-AP STAs, UEs, etc. using various protocols. Embodiments disclosed also relate to software, firmware, and program instructions created, stored, accessed, read or modified by processors using non-transitory computer readable media or computer readable memory.

BRIEF DESCRIPTION OF THE DRAWINGS

Embodiments of the invention will be described, by way of example only, with reference to the drawings.

FIG. 5C shows the amount of CFI data that may be transmitted from one STA to another STA for different antenna configurations.

FIG. 5D shows the format of a VHT MIMO Control field, which may form part of a Compressed Beamforming Feedback (CBF) frame.

FIG. 15 shows an example flowchart illustrating a method 1500 for message flow between an initiator (e.g. a first STA) and responder (one or more second STAs/UEs) in accordance with certain embodiments presented herein.

DETAILED DESCRIPTION

Figure 1:
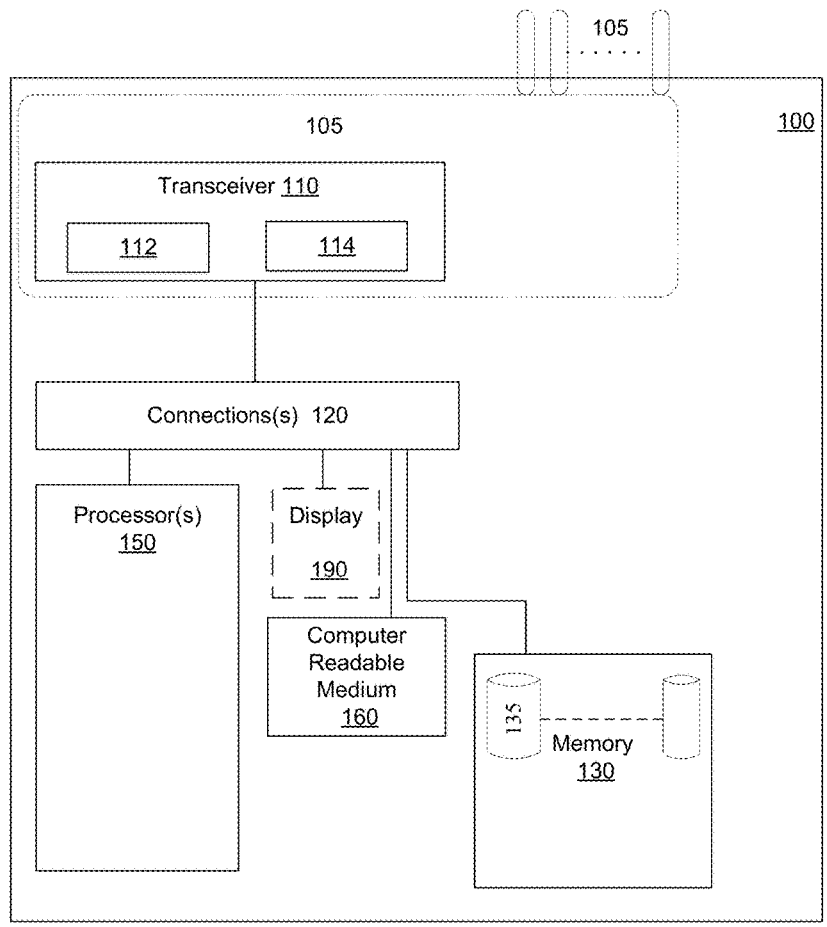
FIG. 1 shows a schematic block diagram illustrating certain exemplary features of a non-AP STA shown as UE 100 enabled to perform wireless communication including unicast, multicast, and/or broadcast, and wireless medium characterization in a wireless environment in accordance with certain embodiments presented herein.

Embodiments disclosed facilitate wireless communication between devices. In some embodiments, wireless communication is facilitated through the use of protocols or modifications to protocols that assist in channel calibration. In some embodiments, channel calibration may include performing measurements related to sounding, ranging, and/or direction finding. In some embodiments, disclosed techniques may be used in wireless environments to facilitate ranging and direction finding between devices. In a set of wirelessly networked devices, disclosed embodiments may facilitate ranging and/or direction finding between two devices (one-to-one) and/or multicast (from one-to-many) and/or broadcast (one to all) devices. The term "unicast" is used to indicate transmission of signals from a STA to a single device, whereas the term "multicast" is used to indicate transmission of signals from a STA to a plurality of devices. The term "broadcast" is used to refer to transmission of signals from a STA to all devices authorized to and/or capable of receiving the transmitted signal.

In modern wireless systems, multiple antennas at the transmitter and receiver may be used to implement multiple input/multiple output (MIMO). MIMO facilitates parallel delivery of multiple spatially multiplexed data signals, which are referred to as multiple spatial streams. Further, in multi-user MIMO (MU-MIMO), an AP may simultaneously transmit to multiple client UEs and beamforming may be used for directional signal transmission or reception. In MU-MIMO, the term "downlink" refers to communication, which may occur in parallel, from an AP (transmitted by the AP) to one or more UEs, while the term "uplink" refers to communication, which may occur in parallel, to an AP (received by the AP) from one or more UEs.

In beamforming, elements in a phased array antenna are combined so that signals at some angles experience constructive interference, while others experience destructive interference. Beamforming can be used to achieve spatial selectivity at the transmitting and receiving ends. For example, in 802.11ac, an AP may use a Null Data Packet Announcement (NDPA), which may be immediately followed by a Null Data Packet (NDP) to determine how to direct a transmission. The NDP can be a physical layer (PHY) frame without data but with a known format and may be used to calibrate the channel. For example, the UE(s) (receivers) receiving the NDP may respond with a "beamforming matrix", which provides some information about the channel. The information can be used by an AP (transmitter) to focus subsequent transmissions.

However, while the beamforming matrix can include some channel related information, the existing beamforming matrix does not include information about Angle of Arrival (AoA), Angle of Departure (AoD), Azimuth, Channel Frequency Response (CFR), Channel Impulse Response (CIR), Power Delay Profile (PDP), First Arrival Correction (FAC), and/or other channel calibration metrics between communicating STAs. Further, the above information cannot be derived from the beamforming matrix. Therefore, additional ranging/sounding message exchanges are often used to obtain the above information thereby increasing system overhead, and latency, which may adversely affecting system performance metrics.

Some disclosed embodiments pertain to beamforming calibration techniques, which facilitate improved UE location determination and/or channel characterization. Further, disclosed embodiments also facilitate the use of multiple transmit chains. For example, some disclosed embodiments may exploit the Null Data Packet (NDP) frame structure to facilitate utilization of multiple transmit chains. In addition, disclosed embodiments provide techniques for exchange of information including one or more of: Angle of Arrival (AoA), Angle of Departure (AoD), Azimuth, Channel Frequency Response (CFR), Channel Impulse Response (CIR), Power Delay Profile (PDP), First Arrival Correction (FAC), and/or other channel calibration parameters/metrics between two communicating STAs, which are also referred to herein as "channel calibration parameters", "channel calibration metrics" or "channel characterization information". In some embodiments, the above channel calibration parameters/metrics may be determined and exchanged between communicating STAs with fewer frame exchanges. For example, in some embodiments, one or more of: frame structure, and/or information elements in frames, and/or message exchange protocols may be leveraged to determine and/or exchange calibration parameters/metrics. Example embodiments are described further herein. Disclosed techniques may also be used to facilitate location determination including determination of micro-locations. In some embodiments, the location determination may be based on one or more of the above channel calibration parameters. For example, disclosed techniques may be embodied in an application on a UE, which may direct a user to a shelf containing a desired product in a store. As other examples, disclosed techniques may be used in surveillance cameras and/or drone navigation. The example message flows, frame formats, and/or information elements described herein may be compatible, in some respects with specifications, diagrams, and guidelines found in some 802.11 standards.

The term "Angle of Arrival" (AoA) refers to a direction of propagation of a radio-frequency wave incident on an antenna array relative to orientation of the antenna array. As one example, AoA may be determined based on the Time Difference of Arrival (TDOA) or phase difference measurements of a radio wave received at individual elements of an antenna array. Conversely, the term "Angle of Departure" (AoD) refers to a direction of propagation of a radio-frequency wave transmitted from an antenna array relative to orientation of the antenna array. In some embodiments, AoA and AoD may determined by a STA based on signals exchanged with another STA. For example, a STA, such as a receiver, may resolve AoA and AoD based on signals exchanged with another STA.

Any suitable technique may be used to estimate AoA information of frames received by a responder device and/or to estimate AoD information for frames transmitted from a responder device. For at least some embodiments, the responder device may use a number of different antenna patterns when estimating the AoA information of frames received from the initiator device. More specifically, when the responder device includes a number N≥2 antennas, the responder device may selectively enable different combinations of the antennas and estimate the channel conditions for a corresponding number of different antenna patterns. Angular information may be obtained using various techniques including, but not limited to: correlation; maximum likelihood estimation; Multiple Signal Classification (MUSIC) techniques, including variants such as Root-MUSIC, Cyclic MUSIC, or Smooth MUSIC; Estimation of Signal Parameters using Rotational Invariance Techniques (ESPRIT); Matrix Pencil, etc.

The term CFR for an $i^{th}$ transmitting (Tx) antenna and a $j^{th}$ receiving (Rx) antenna is also denoted by $H_{ij}(k)$ for a tone k. The term CIR denoted by $h_{ij}[n]$ refers to the inverse Fast Fourier Transform of the CFR, for the $i^{th}$ Tx antenna and a $j^{th}$ Rx antenna. In some embodiments, information exchanged between two communicating STAs may include a subset of information in the CIR (CIR'), which may capture the first arrival information. The length of CIR' may be function of the accuracy of the estimation of first arrival information. The term Channel Feedback Information (CFI) is used herein to refer to CFR, or CIR, or CIR' or PDP or FAC. For example, a Compressed Beamforming (CBF) frame or another frame may include a CFI field. The CFI field may include one or more of: Channel Frequency Response (CFR) information, or Channel Impulse Response (CIR) information, or a subset of the CIR information with first arrival information, or Power Delay Profile (PDP) information, or First Arrival Correction (FAC) information. The PDP is a measure of signal intensity received through a multipath channel as a function of time delay. FAC time information facilitates greater accuracy in the timing of communications between two STAs, which may improve quality in positioning applications.

The term station or "STA" may refer to a device with a Medium Access Control (MAC) identifier coupled to a wireless network. A STA may be viewed as a logical entity that is a singly addressable instance of a medium access control (MAC) and physical layer (PHY) interface to a wireless medium. A STA may take the form of a non-AP STA, which refers to devices such as a mobile station, cellular phone, or a computing device such as a wearable device, laptop, handheld, tablet etc, or another entity coupled to the wireless network. A STA may also take the form of an Access Point STA (AP STA), which refers to APs that provide wireless connectivity to one or more non-AP STAs. An AP STA may be in communication with one or more non-AP devices and/or with other AP STAs. In some instances, in the description below, a STA may also be referred to as an "initiator" or as a "responder" for ease of explanation to distinguish from a STA that initiates a sequence of events from a STA that responds to the initiated sequence. A "STA" may function as both an "initiator" and a "responder". STAs may be mobile or stationary.

A STA may also take the form of "user equipment" (UE) or "mobile station" such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term UE is also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

FIG. 1 shows a schematic block diagram illustrating certain exemplary features of a non-AP STA shown as UE 100 enabled to perform wireless communication including unicast, broadcast, and wireless medium characterization in a MU-MIMO environment in accordance with certain embodiments presented herein. In some embodiments, UE 100 may take the form of a wearable user device, such as a wristwatch, spectacles etc., where one or more functional components of UE 100 may be physically separate but operationally coupled to other functional components. For example, display 190 may be physically separate but operationally coupled processor(s) 150 and/or other functional units in UE 100.

UE 100 may, for example, include one or more processing units or processor(s) 150 and memory 130. UE 100 may also include a wireless network interface 105. In some embodiments, wireless network interface may include transmitter 112 and receiver 114. In some embodiments, UE 100 may further comprise computer-readable medium 160 and display 190. The components above may be operatively coupled to each other with one or more connections 120 (e.g., buses, lines, fibers, links, etc.). In certain example implementations, all or part of UE 100 may take the form of a chipset, and/or the like. Further, UE 100 may optionally include a screen or display 190 capable of rendering images of various types.

In some embodiments, processor(s) 150 may also receive input from transceiver 110, which may receive wireless signals through one or more antennas 105 which may be used for signal transmission and reception using MIMO/MU-MIMO. Transceiver 110 may, for example, include a transmitter 112 enabled to transmit one or more wireless signals over one or more types of wireless communication networks and a receiver 114 to receive one or more signals transmitted over one or more types of wireless communication networks. For example, transceiver 110 may be capable of communication with a Wireless Local Area Network (WLAN), which may be based on IEEE 802.11 standards, Wireless Personal Area Network (WPAN), which may be based on IEEE 802.15 standards and/or a Wide Area Network (WAN) based on one or more cellular communication standards.

Processor(s) 150 may be implemented using a combination of hardware, firmware, and software. In some embodiments, processor(s) 150 may perform position determination and/or location assistance functions based on information derived from wireless measurements by UE 100 either independently, and/or in conjunction with received data or measurements from other STAs. In some embodiments, processor(s) 150, may include transceiver 110, and/or other components as part of a single chip, integrated circuit, or package.

Processor(s) 150 may use some or all of the received signals and/or information to determine channel characterization information including Time Difference of Arrival (TDOA), Round Trip Time (RTT), Received Signal Strength Indication (RSSI), CFR, CIR, PDP, FAC, etc. At locations where wireless signals are available, position determination may be performed based, in part, on the channel characterization information and/or a variety of techniques described herein. For example, techniques including RTT measurements, TDOA, Reference Signal Time Difference (RSTD), Advanced Forward Link Trilateralation (AFLT), hybrid techniques, Received Signal Strength Indicator (RSSI) based measurements, and/or some combination of the above may be used for position determination.

As one example, processor(s) 150 may determine, record, and/or receive: timestamps associated with a time of reception/arrival (TOA) and/or transmission/departure (TOD) of signals, which may be used to determine RTT and/or a distance between UE100 and one or more other devices. Further, AoA, AoD, and other characteristics and parameters described herein may be used to determine or estimate a location/micro-location of devices communicating with UE 100. In some embodiments, the measurements and/or results obtained from measurements may be included in one or more frames exchanged between two STAs, such as between UE 100 and another device in accordance with one or more protocols described herein.

The elements and methodologies described herein may be implemented by various means depending upon the application. For example, these elements and methodologies may be implemented in hardware, firmware, software, or any combination thereof. For example, for a hardware implementation, the processor(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using program code, microcode, procedures, functions, and so on that perform the functions described herein. Any machine-readable medium tangibly embodying instructions may be used in implementing the methodologies described herein. For example, program code, which may be stored in a non-transitory computer-readable medium 160 and/or memory 130, may be read and executed by processor(s) 150.

Memory may be implemented within processor(s) 150 or external to processor(s) 150. As used herein the term "memory" refers to any type of long term, short term, volatile, nonvolatile, or other memory and is not to be limited to any particular type of memory or number of memories, or type of media upon which memory is stored. Memory 130 may include, for example, a primary memory and/or a secondary memory. Primary memory may include, for example, a random access memory, read only memory, etc. While illustrated in this example as being separate from processor(s) 150, it should be understood that all or part of a primary memory may be provided within or otherwise co-located/coupled with processor(s) 150. If implemented in firmware and/or software, the functions may be stored as one or more instructions or program code on a computer-readable medium, such as medium 160 and/or secondary memory. Examples include computer-readable media encoded with computer programs and data associated with or used by the program.

Computer-readable medium 160 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For example, the computer-readable medium including program code stored thereon may include program code to support wireless communication including unicast, broadcast, and wireless medium/channel characterization in a MU-MIMO environment in accordance with certain embodiments presented herein. The program code may further support wireless channel characterization, including sounding, ranging and/or position determination. For example, the code may support one or more of AFLT/RTT/RSSI/RSTD/TDOA/AoA/AoD, and other location determination techniques and/or channel characterization.

In some embodiments, instructions and/or data may be provided over a communication channel. For example, a communication apparatus may include a transceiver 110, which may receive signals through receiver 114 indicative of instructions and data. The instructions and data may cause one or more processors to implement wireless communication and/or wireless channel characterization (e.g. in a MU-MIMO environment), including ranging and/or position determination. The instructions and data may also cause one or more processors to implement functions outlined herein.

Figure 2:
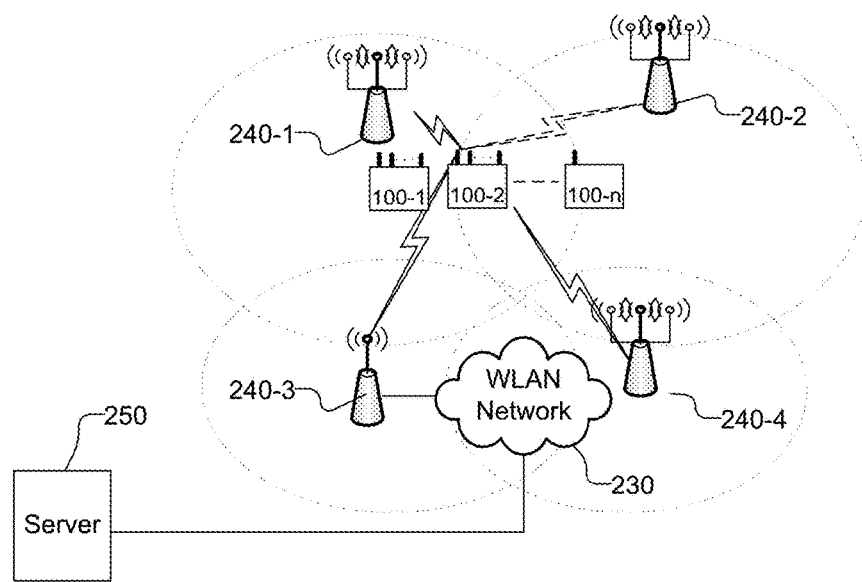
FIG. 2 shows a simplified architecture of a wireless communication system 200 in accordance with certain embodiments presented herein.

FIG. 2 shows a simplified architecture of a wireless communication system 200 in accordance with certain embodiments presented herein. System 200 may include non-AP STAs such as UEs 100-1 through 100-$n$ (collectively referred to as UEs 100), and AP STAs such as APs 240-1 through 240-4 (collectively referred to as STAs 240), which may communicate over WLAN 230. In some embodiments, UEs 100 and APs 240 may communicate with server 250 over WLAN 230. While system 200 illustrates a few UEs 100 and APs 240, the number of UEs 100 and APs 240 may be varied in accordance with various design parameters and may include a smaller or larger number of UEs 100 and/or APs 240. In some embodiments, one or more UEs 100 and/or APs 240 may comprise multiple antennas and may support MIMO, including MU-MIMO.

In some embodiments, UEs 100 and APs 240 may communicate over a WLAN network, which may be based on IEEE 802.11 or compatible standards. In some embodiments, UEs 100 and APs 240 may communicate using variants of the IEEE 802.11 standards. For example, UEs 100 and APs 240 may communicate using 802.11ac on the 5 GHz band, which may support MIMO, MU-MIMO and multiple spatial streams. In some embodiments, UEs 100 and APs 240 may communicate using some of the above standards, which may further support one or more of Very High Throughput (VHT) (as described in the above standards) and High Efficiency WLAN (HEW), and/or beamforming with standardized sounding and feedback mechanisms. In some embodiments, UEs 100 and/or APs 240 may additionally support legacy standards for communication with legacy devices.

In some embodiments, UEs 100 and/or APs 240 may be connected with one or more additional networks, such as a cellular carrier network, a satellite positioning network, WPAN access points, and the like (not shown in FIG. 2). In some embodiments, UEs 100 and/or APs 240 may be coupled to a wireless wide area network (WWAN) (not shown in FIG. 2). A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax, and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available.

As illustrated in FIG. 2, UE 100 may also communicate with server 250-1 through network 230 and APs 240, which may be associated with network 230. UE 100 may receive and measure signals from APs 240, which may be used for position determination. In some embodiments, APs 240 may form part of a wireless communication network 230, which may be a wireless local area network (WLAN). For example, a WLAN may be an IEEE 802.11x network.

Figure 3:
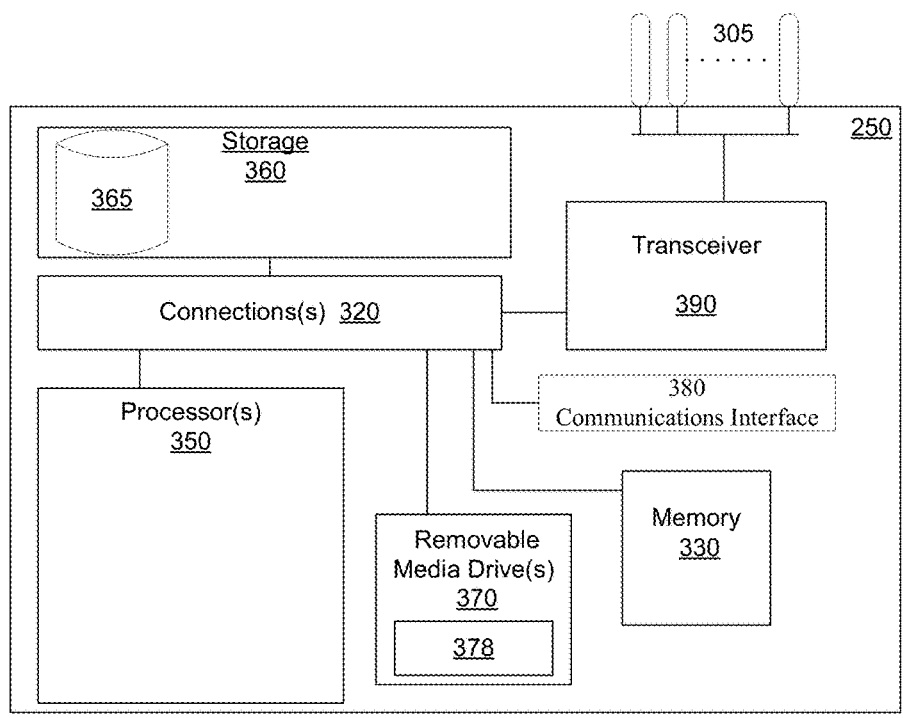
FIG. 3 shows schematic block diagram illustrating AP 240 enabled to perform wireless communication including unicast, multicast, and/or broadcast, and wireless medium characterization in a wireless environment in accordance with certain embodiments presented herein.

Reference is now made to FIG. 3, which is a schematic block diagram illustrating AP 240. In some embodiments, AP 240 may be enabled to perform wireless communication (including unicast, multicast, and broadcast) and wireless medium characterization. For example, the wireless communication and/or wireless medium characterization may be performed in a MU-MIMO environment in accordance with certain embodiments presented herein. In some embodiments, UE 100 may serve as an AP 100.

In some embodiments, AP 240 may include, for example, one or more processor(s) 350, memory 330, coupled storage 360, and transceiver 390, which may be operatively coupled with one or more connections 320 (e.g., buses, lines, fibers, links, etc.). Transceiver 390 may be capable of communication with a Wireless Local Area Network (WLAN), which may be based on the IEEE 802.11 standard (or variants thereof), Wireless Personal Area Network (WPAN), which may be based on IEEE 802.15 and/or a Wide Area Network (WAN) based on one or more cellular communication standards. In some embodiments, transceiver 390 may be coupled to one or more antennas 305, which may be used for signal transmission and/or reception using MIMO/MU-MIMO.

In some embodiments, AP 240 may also interface with wired networks through communications interface 380 to obtain a variety of network configuration related information, such as service set identifiers (SSIDs), basic service set identification (BSSID), network identifiers and/or timing information. Processor(s) 350 may use some or all of the received information to generate CFI, TDOA, RTT, RSSI, CFR, CIR, PDP, Range, AOA, AOD, Azimuth, and other channel characterization information in accordance with certain with disclosed embodiments.

Processor(s) 350 may be implemented using a combination of hardware, firmware, and software, or any combination thereof. For a hardware implementation, the processing unit 950 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented using procedures, functions, and so on that perform the functions described herein.

Any machine-readable medium tangibly embodying instructions may be used in implementing the methodologies described herein. For example, software may be stored in removable media drive 370, which may support the use of non-transitory computer-readable media 378, including removable media. Program code may be resident on non-transitory computer readable media 378 and/or memory 330 and may be read and executed by processors 350. For example, the computer-readable medium including program code stored thereon may include program code to support wireless communication (including unicast, multicast, and broadcast), and/or wireless medium characterization (including in a MIMO/MU-MIMO) environment in accordance with certain embodiments presented herein. Memory 330 may be implemented within processors 350 or external to the processors 350.

In certain implementations, secondary memory may be operatively receptive of, or otherwise configurable to couple to a non-transitory computer-readable medium 378. As such, in certain example implementations, the methods and/or apparatuses presented herein may take the form in whole or part of a removable media drive 370 that may include non-transitory computer readable medium 378 with computer implementable instructions stored thereon, which if executed by at least one processing unit 350 may be operatively enabled to portions of the example operations including message flows and protocols described herein.

Figure 4A:
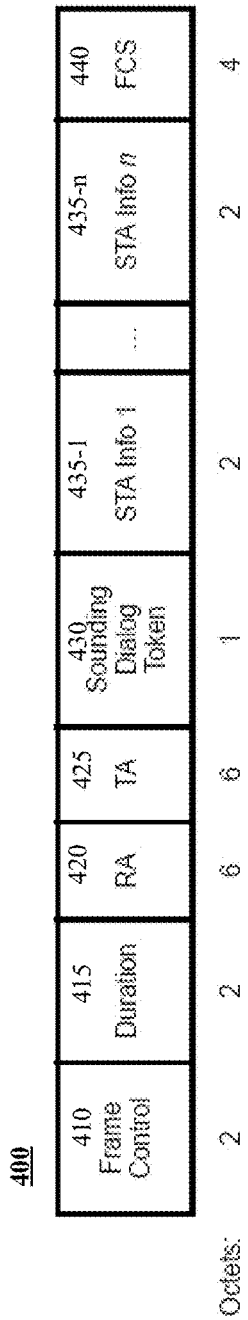
FIG. 4A shows an exemplary NDPA frame 400 with information pertaining to a subsequent NDP frame in accordance with certain embodiments presented herein.

FIG. 4A shows an exemplary NDPA frame 400 with information pertaining to a subsequent NDP frame in accordance with certain embodiments presented herein. In some embodiments, NDPA frame 400 may take the form of an 802.11ac NDPA frame as defined in "Part 11: Wireless LAN Medium Access Control (MAC) and Physical Layer (PHY) Specifications," IEEE P802.11-REVmc™/D5.0, January 2016, Draft Standard for Information technology—Telecommunications and information exchange between systems Local and metropolitan area networks—Specific requirements, (hereinafter "WLAN MAC & PHY Specifications") § 8.3.1.20, at 621-622, which is incorporated by reference in its entirety herein.

In some embodiments, NDPA frame may include Duration field 415, RA (Recipient Address) field 420, TA (Transmitter Address) field 425, Sounding Dialog token 430, STA Info field(s) 435-1 . . . 435-n, and FCS field 440. The NDPA frame contains at least one STA Info field. These fields are further described in the WLAN MAC & PHY Specifications document.

In some embodiments, when the NDP Announcement frame (e.g. VHT NDPA includes more than one STA Info field 435, the RA field 420 of the NDP Announcement frame can be set to the broadcast address. When the VHT NDP Announcement frame includes a single STA Info field 435, the RA field 420 of the VHT NDP Announcement frame can be set to the MAC address of the VHT beamformee. The TA field may, for example, be set to the address of a UE 100 transmitting the VHT NDP Announcement frame.

Figure 4B:
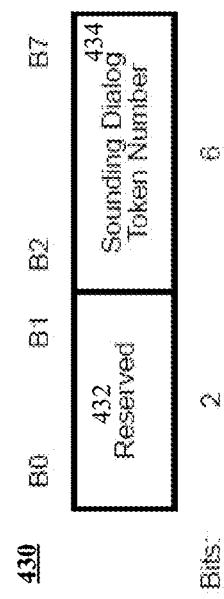
FIG. 4B shows the format of the Sounding Dialog Token field 430 including a Reserved subfield 432 with a 2-bit length and Sounding Dialog Token Number subfield 434 in accordance with certain embodiments presented herein.

The format of the Sounding Dialog Token field 430 is shown in FIG. 4B and includes Reserved subfield 432 with a 2-bit length and Sounding Dialog token number subfield 434. The Sounding Dialog Token Number subfield in the Sounding Dialog Token field contains a value selected by the AP (beamformer) to identify NDPA frame 400.

In some embodiments, a first bit in Reserved subfield 432 may be used by the initiator to indicate to the responder that the immediately subsequent NDP is to be used for ranging. In some embodiments, a second bit in the Reserved subfield 432 may be used to indicate symmetric ranging, to indicate that one side (e.g. the initiator) is willing to share information, such as ranging information (e.g. captured and/or determined by the initiator). In the example embodiments below, use of NDP frames for ranging and symmetric/asymmetric ranging may be indicated by appropriately configuring bits in Reserved subfield 432. In some embodiments, portions of other information elements in NDPA frame 400 may be used to indicate: (i) that a subsequent NDP frame is to be used for ranging; and/or (ii) that the initiator is willing to share ranging and/or other measured/determined channel characterization information.

In some embodiments, NDP frames, which may be transmitted from multiple antennas, may be leveraged to determine AoA, AoD, and other parameters. In some embodiments, the AoA, AoD and other determined information may be included in an FTM frame thereby facilitating location determination. In some embodiments, by determining AoA, AoD, and RTT, a device may be able to determine its 3D location based on an exchange of FTM frames with one other device with a known location thereby decreasing network traffic, lowering overhead, and/or facilitating quicker position determination. In the description below, a STA requesting a specific ranging/sounding or other operation may be termed an "Initiator" of the operation, while a STA responding to the ranging/sounding or other request may be termed a "Responder" of the operation.

Figure 5A:
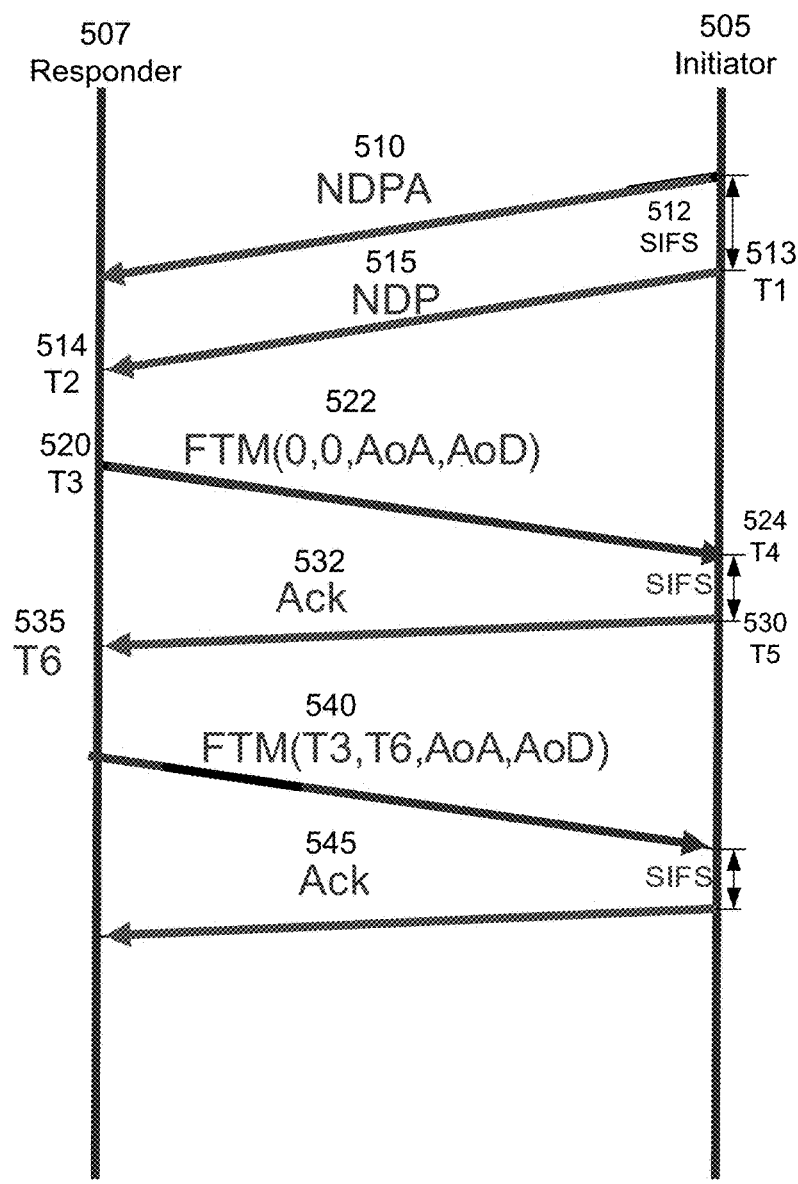
FIG. 5A shows an example unicast message flow 500 between an initiator 510 (e.g. AP 240) and responder (e.g. UE 100) in accordance with certain embodiments presented herein.

FIG. 5A shows an example message flow 500 for ranging between an Initiator 505 (e.g. AP 240) and Responder (e.g. UE 100) 507 in accordance with certain embodiments presented herein. For example, a first bit in Reserved subfield 432 (FIG. 4B) may be used by Initiator 505 to indicate to Responder 507 that immediately subsequent NDP frame 515 is to be used for ranging. Further, NDPA frame 510 may include a single STA Info field 435 (indicating unicast) and the RA field 420 may be set to the address of Responder 507. Exemplary message flow 500, shown in FIG. 5A, may be consistent in some respects, for example, with specifications, diagrams, and guidelines found in some 802.11 standards.

As shown in FIG. 5A, NDPA frame 510 may be sent by Initiator 505. NDPA frame 510 may be followed by transmission of NDP frame 515 at time T1 513 after a time interval given by Short Interframe Space (SIFS) time interval 512 measured from the end of transmission of NDPA frame 510. Time intervals in the following figures are not shown to scale. NDP Frame 512 may be received by Responder 510 at time T2 514. Time T1 513 may be captured by Initiator 505, while time T2 514 may be captured by Responder 510.

The SIFS interval, is a range of time duration values for which are provided by relevant IEEE 802.11 standards. The SIFS interval may, for example, specify a time to transition from a receive mode (e.g., to receive a request or other frame) to a transmit mode (e.g., to transmit an acknowledgment or other frame).

Responder 507 may respond capturing a first time T3 at which Fine Timing Measurement (FTM) frame 522 is transmitted. An FTM procedure may be used for ranging measurements, for example, for a UE (e.g. non-AP STA) to obtain its range to another STA (e.g. AP STA). FTM may be used to provide increased timestamp resolution. In some embodiments, the timestamp resolution may range from 10 nanoseconds to 100 picoseconds.

Further, in some embodiments, FTM frame 522 may include Angle of Arrival (AoA) and Angle of Departure (AoD) measurements, or other angular measurements, from the previously received NDP. In some embodiments, FTM frame 522 may be sent at a time subsequent to angular computations performed by the Responder 507. In some embodiments, FTM frame 522 may optionally include various other measured parameters as outlined further below. In some embodiments, AoA and AoD may determined (e.g. by Responder 507) based on measurements obtained during NDP and NDPA packet transmission.

After a SIFS time interval measured from the end of reception of FTM frame 522, Initiator 505 may respond with an Acknowledgement (Ack) message 532 capturing a second time T4 524 at which the FTM frame arrives at Initiator 505 and a third time T5 530 at which Initiator 505 transmits Ack message 532. Responder 507 may capture a fourth time T6 535 at which Ack message 532 arrives at Responder 507.

In some embodiments, Responder 510 may respond to Ack message 532 with FTM frame 540, which may include times T3 520, T6 535, AoA and AoD information. In some embodiments, FTM frame may include Channel Feedback Information (CFI). In some embodiments, FTM frames 522 and 540 may include CFI. CFI may facilitate computation of AoD for a multi-chain initiator and/or computation of a more precise ranging estimate (e.g. improved determination of arrival time for the NDP frame) due to the inclusion of multi-chain information in the CFI.

After a SIFS time interval measured from the end of reception of FTM frame 540, Initiator 505 may respond to FTM frame 540 with Ack message 545. In some embodiments, FTM sessions such as shown in exemplary message flow 500 may be used to determine RTT between Initiator 505 and Responder 507 and/or Time Difference Of Arrival (TDOA) timing information associated with the respective access points. In some embodiments, a position calculation unit in a UE and/or AP may determine a position of the UE based on RTT and/or TDOA information derived from the FTM session(s). For example, RTT may be calculated by Initiator 505 based on times T3, T4, T5, and T6 by computing (T6−T3)−(T5−T4).

FTM responders may sometimes transmit an FTM frame in response to an FTM Request. The additional FTM request that precedes the FTM frame transmission may increase overhead. Further, conventional schemes transmit FTM frames using a single antenna, which may limit calculation of various ranging parameters related to transmission modes. Moreover, when a single antenna is used for transmission, the types of parameters that can be measured may be limited and/or measurement accuracy may suffer. For example, if AoA is measured and/or determined based on transmission from a single antenna, the measurement may be inaccurate relative to AoA measured/determined from multiple antenna transmissions. In some embodiments disclosed herein, FTM frames may be transmitted using multiple antennas thereby facilitating: (i) accurate computation of various parameters, (ii) in multiple transmission modes. In some embodiments, NDP frames, which may be transmitted using multiple antennas, may facilitate measurement of AoA, AoD, and/or various other parameters, as outlined further below.

Figure 5B:
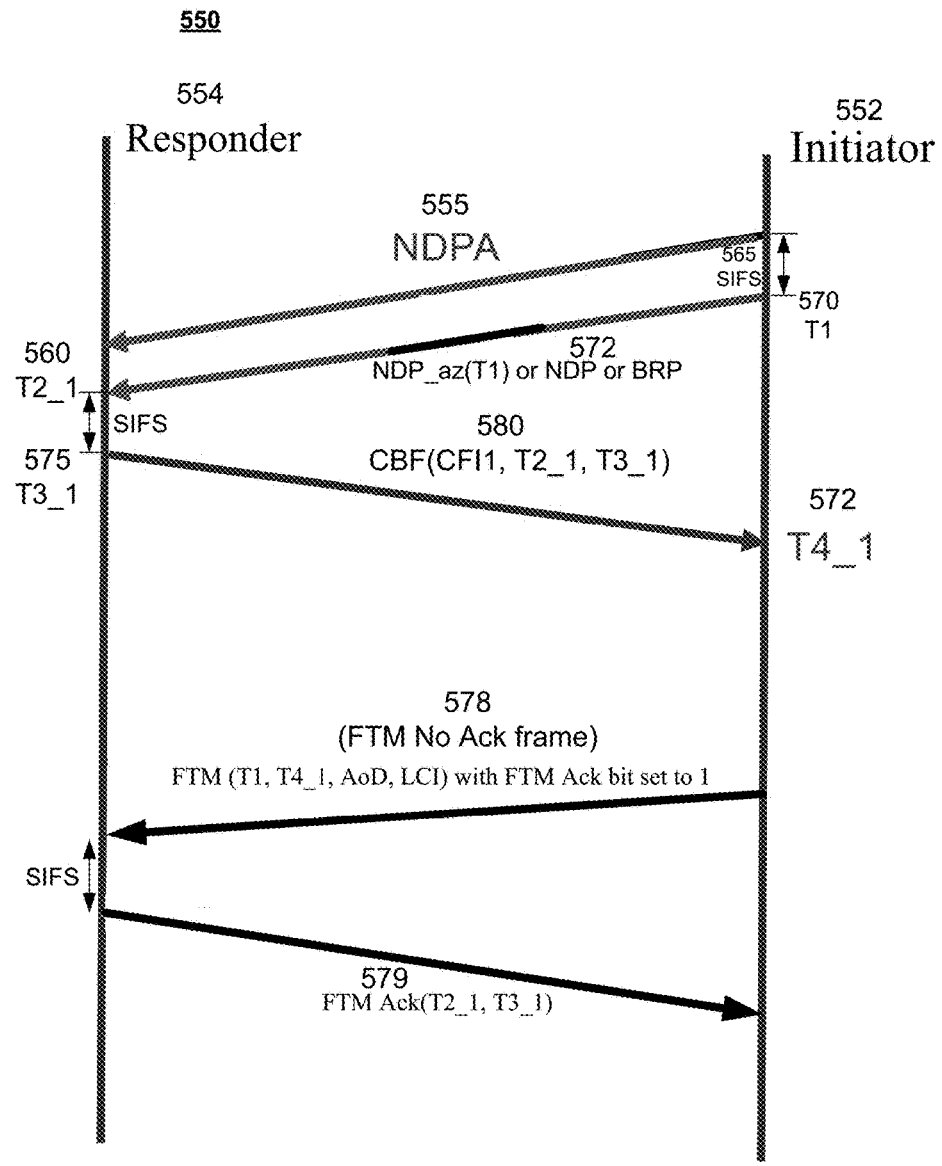
FIG. 5B shows an example unicast message flow 550 between an initiator 552 (e.g. AP 240) and a responder identified as Responder 1 554 (e.g. non-AP STA/UE 100), in accordance with certain embodiments presented herein.

FIG. 5B shows an example unicast message flow 550 between an Initiator 552 (e.g. AP 240) and a responder identified as Responder 554 (e.g. non-AP STA/UE 100), in accordance with certain embodiments presented herein. For example, a first bit in Reserved subfield 432 (FIG. 4B) may be used by Initiator 552 to indicate to Responder 554 that immediately subsequent NDP frame 572 is to be used for ranging. Further, NDPA frame 555 may include a single STA Info field 435 (indicating unicast) and the RA field 420 may be set to the address of Responder 554.

As shown in FIG. 5B, NDPA frame 555 may be unicast by Initiator 552. NDPA frame 555 may be followed by transmission of frame 572 at time T1 570 after a time interval given by SIFS 565 measured from the end of transmission of NDPA frame 555. As shown in FIG. 5B, frame 572 may take the form of one of: an NDP_az frame, or an NDP frame, or a Beam Refinement Protocol (BRP) frame.

Responder 554 may capture a first time T2_1 560 at which NDP frame 555 is received and a second time T3_1 575 at which the CBF frame is sent. CBF frame 580 may be sent at time T3_1 575 after a time interval given by SIFS measured from the end of reception of frame 572.

In some embodiments, CBF frame 580 may include CFI shown as CFI1 and times T2_1 560 and T3_1 575, or its difference. In some embodiments, Initiator 552 may capture the time T4_1 572 at which CBF frame 580 is received. Conventionally, CBF frames may include angles associated with beamforming matrices. In some embodiments described herein, CBF frames may alternatively (or additionally) include CFI1. Initiator 552 may determine an AoD or Location Configuration Information (LCI) from CFI1 transmitted in CBF frame 580. LCI determined from CFI1 may include location information such as latitude/longitude information of Responder 554.

In some embodiments, Responder 554 may determine an AoD based on NDP frame 572 and/or calibration data from Initiator 552. In some embodiments, Responder 554 may also determine an LCI (e.g. latitude/longitude) from previously acquired location information (e.g. information from a beacon frame) from Initiator 552.

In some embodiments, Initiator 552 may further respond with FTM No Ack frame 578 including time T1 570, time T4_1 572, AoD, and LCI. As used herein, an "FTM No Ack" frame may take the form of an FTM frame with an acknowledgment response field, bit or other indication that a response to the "FTM No Ack" frame may be sent in the form of an FTM frame, which is referred to herein as an "FTM Ack" frame. When the acknowledgment response field or bit is not set, a regular Ack frame may sent in response to the FTM No Ack frame. In some embodiments, a regular Ack frame may sent in response to the FTM No Ack frame, when the responder lack the capability for an "FTM Ack" response. For clarity and ease of description, the acknowledgment response field, bit or other indication is also referred to herein as an "FTM Ack" bit.

In conventional exchanges, FTM frames are responded to with an Acknowledgement (Ack) frame (e.g. Ack frame 532 in FIG. 5A). In some embodiments, setting a bit termed the "FTM Ack" bit to 1 in a FTM No Ack frame, may be used to indicate that a conventional Ack frame response is not desired. In some embodiments, the response to an FTM No Ack frame may take the form of an FTM Ack frame, which may be of a format similar to that of an FTM frame.

In some embodiments, the FTM frame may be augmented with an "FTM Ack" bit, which is set to 1 in FIG. 5B. The FTM Ack bit may be used to indicate that the receiver of FTM No Ack frame 578 with FTM Ack=1 may respond with an FTM Acknowledgement (FTM Ack) frame such as FTM Ack frame 579.

In some embodiments, upon receipt of FTM No Ack frame 578 with FTM Ack=1, Responder 554 may respond after a SIFS interval with FTM Ack frame 579 including time T 2_1 560 and time T3_1 575. In some embodiments, the Round Trip Time between Initiator 552 and Responder 554 may be calculated, for example, as RTT=(T4_1–T1)–(T3_1–T2_1) by Initiator 552 and/or Responder 1 554.

Existing CBF structure supports a maximum of: 8 streams (56 angles), 468 subcarriers, and 8 bits per tone on average. Thus, the CBF may hold (468*56)/(2*8/8)=13.1K bytes of information, which may support some multi-antenna embodiments described herein.

FIG. 5C shows the amount of CFI data that may be transmitted from a transmitting STA to a receiving STA for different antenna configurations. In some embodiments, a CFI information element/field may be added or incorporated as an optional sub-element to the current FTM frame definition. In some embodiments, the CFI field may be structured in a manner similar to a Channel State Information (CSI) Report field as defined in various specifications. For example, the structure of the CFI field may mirror the structure of the CSI Report field as defined in the WLAN MAC & PHY Specifications (e.g. Table 9-52, § 9.4.1.28).

FIG. 5D shows the format of a VHT MIMO Control field 547, which may form part of a Compressed Beamforming Feedback (CBF) frame 547. VHT MIMO Control field 547 includes Reserved bits 586, which are bits B16 and B17 in the VHT MIMO control field. In some embodiments, for example, when Nc Index subfield 557=7 (Nc=8), and Nr Index subfield 567=7 (Nr=8), Channel Width subfield 577=3 (160 MHz or 80+80 MHz), Grouping subfield 587=0 (Ng=1, no grouping), Codebook Information subfield 588=1, and Feedback type subfield 589=0 (single user) or 1 (multi user), then, Reserved bits 586 may be used to indicate that the CBF frame is being used for ranging/RTT purposes. In some embodiments, Grouping subfield 587=3 (which is reserved) may also be used to indicate that the CBF frame is being used for ranging/RTT purposes (e.g. as shown in FIG. 5B).

Figure 5E:
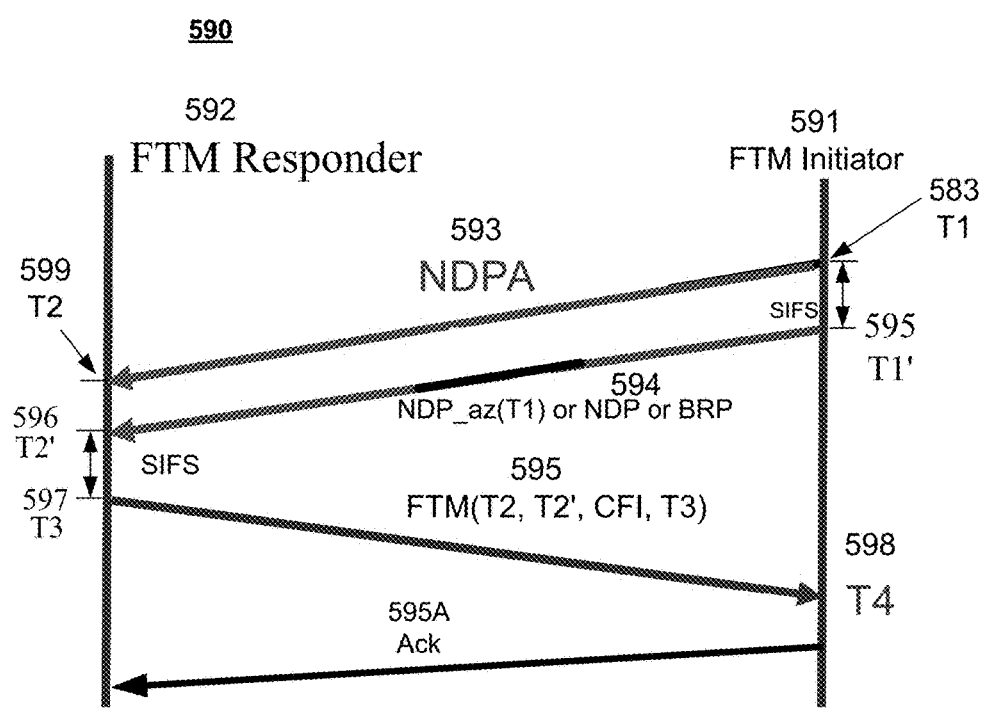
FIG. 5E shows a unicast message flow 590 with NDPA 593 announcing a subsequent frame (NDP_az, NDP, or BRP) sent according to some disclosed embodiments.

FIG. 5E shows a unicast message flow 590 with NDPA 593 announcing a subsequent frame (NDP_az, NDP, or BRP) for ranging according to some disclosed embodiments. As shown in FIG. 5E, NDPA frame 593 may be unicast by FTM Initiator 591 at time T1 583. NDPA frame 593 may be followed by transmission of frame 594 at time T1' 595 after a time interval given by Short Interframe Space (SIFS) 565 measured from the end of transmission of NDPA frame 593.

Further, as shown in FIG. 5E, frame 594, which follows NDPA frame 593, may take the form of one of: an NDP_az frame with time T1 591, or an NDP frame, or a Beam Refinement Protocol (BRP) frame.

FTM Responder 592 may capture a first time T2 599 at which NDPA frame 593 is received, and a second time T2' 596 at which frame 594 is received and a third time T3 597 at which FTM frame 595 is received. FTM frame 595 may include time T2 599, time T2' 596. CFI, and time T3 597. As shown in FIG. 5E, FTM frame 595 may be sent after a SIFS time interval following the end of reception of frame 594.

When FTM Initiator 591 and FTM Responder 592 are synchronized the Time of Flight may be calculated as: (a) the difference of times T2 599 and T1 583, (T2 T1); or (b)

$$\frac{(T2-T1)+(T2'-T1')}{2}.$$

When FTM Initiator 591 and FTM Responder 592 are not synchronized, the TOF is:

$$TOF = \frac{RTT}{2} = \frac{(T4-T1')-(T3-T2')}{2}.$$

In some embodiments, FTM Initiator 591 may respond to FTM frame 595 with Acknowledgement (Ack) frame 595A.

Figure 6:
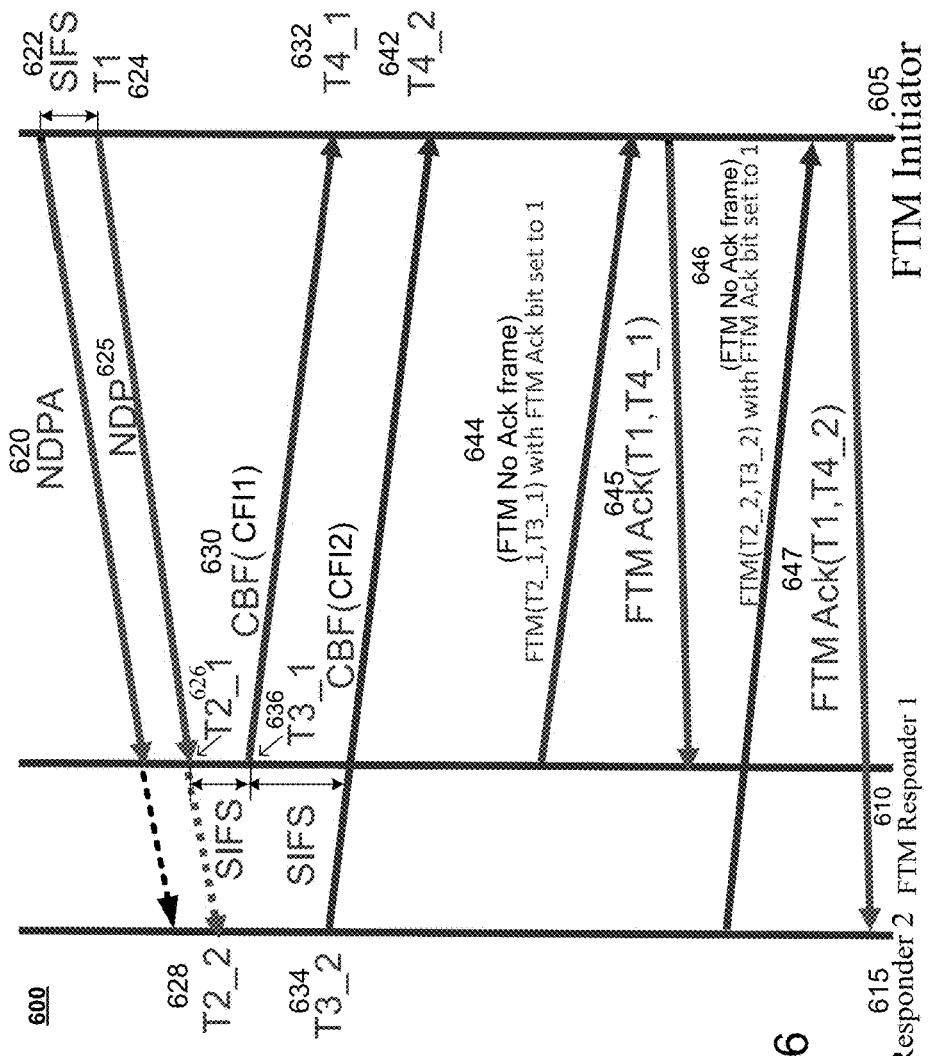
FIG. 6 shows an example message flow 600 between FTM Initiator 605 (e.g. AP 240) and two FTM responders FTM Responder 1 610 and FTM Responder 2 615 (e.g. UEs 100-1 and 100-2), where an NDPA is broadcast to both FTM Responder 1 and FTM Responder 2.

FIG. 6 shows an example message flow 600 between FTM Initiator 605 (e.g. AP 240) and two FTM responders FTM Responder 1 610 and FTM Responder 2 615 (e.g. UEs 100-1 and 100-2), where an NDPA is broadcast to both FTM Responder 1 and FTM Responder 2.

As shown in FIG. 6, NDPA frame 620 may be broadcast or multicast by FTM Initiator 605. For example, a first bit in Reserved subfield 432 (FIG. 4B) may be used by FTM Initiator 605 to indicate to Responder 507 that immediately subsequent NDP frame 515 is to be used for ranging. For example, NDPA frame 620 may include multiple STA Info fields 435 (FIG. 4A) to indicate broadcast and the RA field 420 (FIG. 4A) may be set to the broadcast address. NDPA frame 620 may be followed by transmission of NDP frame 625 at time T1 624 after a time interval given by SIFS 622 measured from the end of transmission of NDPA frame 620.

FTM Responder 1 610 may capture a first time T2_1 626 at which NDP frame 625 is received by FTM Responder 1

610 and a second time T3_1 636 at which Compressed Beamforming Feedback (CBF) frame 630 is sent by FTM Responder 1 610. In some embodiments, CBF frame 630 may be sent by FTM Responder 1 610 after a time interval given by SIFS from the reception of NDP frame 625. In some embodiments, appropriate reserved bits 586 (FIG. 5D) in VHT MIMO control field (FIG. 5D) may be set in CBF frames to indicate that the CBF frame is being used for ranging/RTT purposes. In some embodiments, CBF frame 630 may include CFI of FTM Responder 1 (CFI_1). In some embodiments, FTM Initiator 605 may capture the time T4_1 632 at which CBF frame 630 is received.

Further, FTM Responder 2 615 may capture a first time T2_2 628 at which NDP frame 625 is received by FTM Responder 2 615 and a second time T3_2 634 at which Compressed Beamforming Feedback (CBF) frame 640 is sent by FTM Responder 2 615. In some embodiments, CBF frame 640 may be sent by FTM Responder 2 615 after a time interval given by SIFS from the reception of NDP frame 625 at Responder 2. In some embodiments, CBF frame 640 may include CFI of FTM Responder 2 (CFI_2). In some embodiments, FTM Initiator 605 may capture the time T4_2 642 at which CBF frame 630 is received.

In some embodiments, FTM Responder 1 610 may further respond with FTM No Ack frame 644 including times T2_1 626 and T3_1 636. FTM No Ack frame 644 may be augmented with an "FTM Ack" bit, which is set to 1 in FIG. 6A. The FTM Ack bit may be used to indicate that the receiver of FTM frame 644 with FTM Ack=1 may respond with an FTM Acknowledgement (FTM Ack) frame such as FTM Ack frame 645. In some embodiments, upon receipt of FTM No Ack frame 644 with FTM Ack=1, Initiator 605 may respond with FTM Ack frame 645 including times T1 624 and T4_1 632. In some embodiments, RTT1=(T4_1−T1)−(T3_1−T2_1), where RTT1 is the RTT between Initiator 605 and Responder 1 610. RTT1 may be calculated by Initiator 605 and/or Responder 1 610. In some embodiments, the FTM Ack frame may be of a similar or the same format as an FTM frame.

In some embodiments, Responder 2 615 may further respond with FTM No Ack frame 646 including times T2_2 628 and T3_2 634. FTM No Ack frame 646 may be augmented with an "FTM Ack" bit, which is set to 1 in FIG. 6A. The FTM Ack bit may be used to indicate that the receiver of FTM frame 646 with FTM Ack=1 may respond with an FTM Acknowledgement (FTM Ack) frame such as FTM Ack frame 647. In some embodiments, upon receipt of FTM No Ack frame 646 with FTM Ack=1, Responder 2 615 may respond with FTM Ack frame 647 including times T1 624 and T4_2 642. In some embodiments, RTT2=(T4_2−T1)−(T3_2−T2_2), where RTT2 is the RTT between Initiator 605 and Responder 2 615. RTT2 may be calculated by Initiator 605 and/or Responder 2 615.

In some embodiments, an order or priority scheme may be established among responders to facilitate responses by multiple responders to NDPA frame 620 and NDP frame 625. In general, in an environment with k responders, the RTT for the $k^{th}$ responder may be calculated as (T4_k−T1)−(T3_k−T2_k), where: T4_k is the time of reception of CBF frame from the $k^{th}$ responder at Initiator 605; T2_k is the time of reception of NDP frame 625 at the $k^{th}$ responder; and T3_k is the time at which the CBF frame from the $k^{th}$ responder is transmitted. As outlined above, the CBF frame from the $k^{th}$ responder may include CFI for Responder k (CFIk).

Figure 7A:
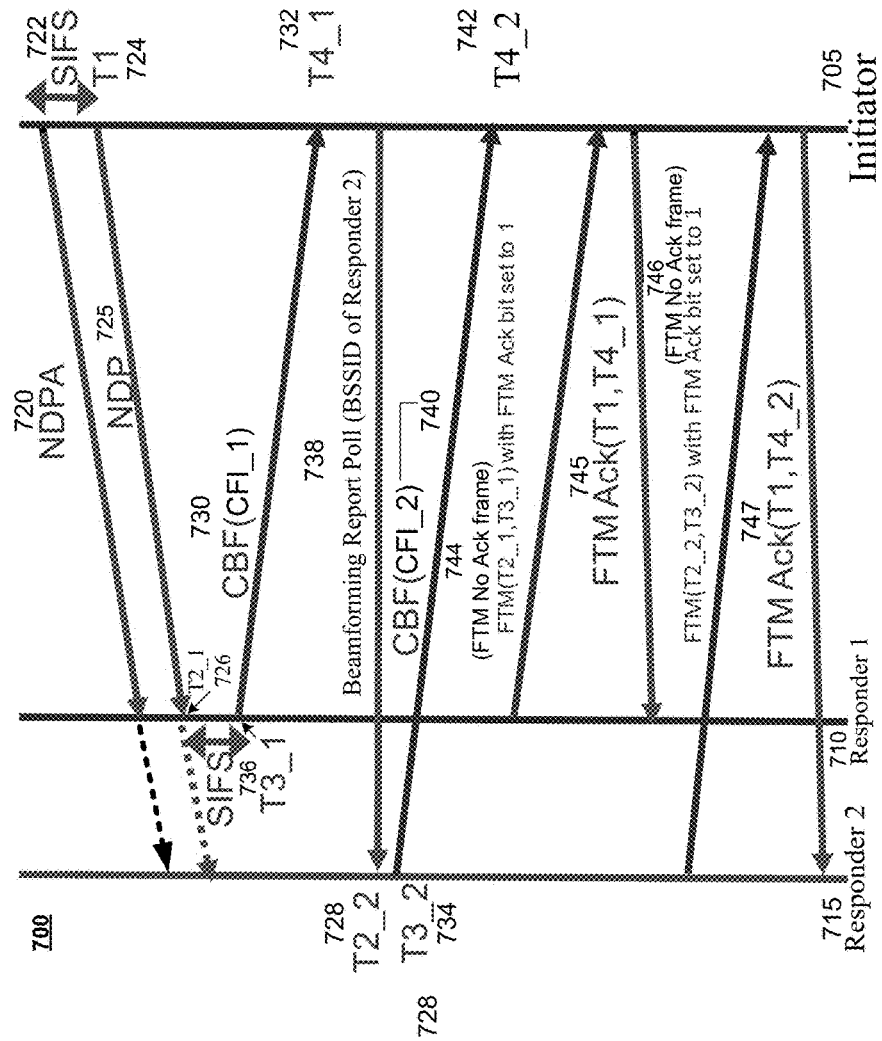
FIG. 7A shows an example message flow 700 between Initiator 705 (e.g. AP 240) and two responders Responder 1 710 and Responder 2 715 (e.g. UEs or non-AP STAs 100-1 and 100-2), where an NDPA is broadcast/multicast to responders Responder 1 and Responder 2.

FIG. 7A shows an example message flow 700 between Initiator 705 (e.g. AP 240) and two responders Responder 1 710 and Responder 2 715 (e.g. UEs or non-AP STAs 100-1 and 100-2), where an NDPA is broadcast/multicast to responders Responder 1 and Responder 2.

As shown in FIG. 7A, NDPA frame 720 may be broadcast by Initiator 705. NDPA frame 720 may be followed by transmission of NDP frame 725 at time T1 724 after a time interval given by SIFS 722 measured from the end of transmission of NDPA frame 720.

Responder 1 710 may capture a first time T2_1 726 at which NDP frame 725 is received by Responder 1 710 and a second time T3_1 736 at which Compressed Beamforming Feedback (CBF) frame 730 is sent by Responder 1 710. In some embodiments, CBF frame 730 may be sent by Responder 1 710 after a time interval given by SIFS from the end of reception of NDP frame 725. In some embodiments, Reserved bits 586 (FIG. 5D) may be used to indicate that the CBF frame is being used for ranging/RTT purposes. In some embodiments, CBF frame 730 may include one CFI of Responder 1 (CFI_1) In some embodiments, Initiator 705 may capture the time T4_1 732 at which CBF frame 730 is received.

In some embodiments, Initiator 1 705 may send a Beamforming Report Poll frame 738, with a Basic Service Set IDdentifier (BSSID) associated with Responder 2 715. The BRP frame may be used to obtain a beamforming report (such as a Very High Throughput (VHT) beamforming report) from a prior sounding. Responder 2 715 may capture a first time T2_2 728 at which BRP frame 738 is received by Responder 2 715 and a second time T3_2 734 at which CBF frame 740 is sent by Responder 2 715. In some embodiments, CBF Trigger frame 740 may be sent by Responder 2 715 after a time interval given by SIFS from the end of reception of CBF Trigger frame 738 at Responder 2 715. In some embodiments, CBF frame 740 may include one of CFI of Responder 2 (CFI_2). In some embodiments, Initiator 705 may capture the time T4_2 742 at which CBF frame 730 is received.

In some embodiments, Responder 1 710 may further respond with FTM No Ack frame 744 including times T2_1 726 and T3_1 736. FTM No Ack frame 744 may be augmented with an "FTM Ack" bit, which is set to 1 in FIG. 7A. The FTM Ack bit may be used to indicate that the receiver of FTM frame 744 with FTM Ack=1 may respond with an FTM Acknowledgement (FTM Ack) frame such as FTM Ack frame 745. In some embodiments, upon receipt of FTM No Ack frame 744 with FTM Ack=1, Responder 1 710 may respond with FTM Ack frame 745 including times T1 724 and T4_1 732. In some embodiments, RTT1=(T4_1−T1)−(T3_1−T2_1), where RTT1 is the RTT between Initiator 705 and Responder 1. Since both Initiator 705 and Responder 1 710 have sufficient timestamp information, RTT1 may be calculated by Initiator 605 and/or Responder 1 710.

In some embodiments, Responder 2 715 may further respond with FTM No Ack frame 746 including times T2_2 728 and T3_2 734. FTM No Ack frame 746 may be augmented with an "FTM Ack" bit, which is set to 1 in FIG. 7A. The FTM Ack bit may be used to indicate that the receiver of FTM frame 746 with FTM Ack=1 may respond with an FTM Acknowledgement (FTM Ack) frame such as FTM Ack frame 747. In some embodiments, upon receipt of FTM No Ack frame 746 with FTM Ack=1, Responder 2 715 may respond with FTM Ack frame 747 including times T1 724 and T4_2 742. In some embodiments, RTT2=(T4_2−T1)−(T3_2−T2_2), where RTT2 is the RTT for Responder 2 and may be calculated by Initiator 705 and/or Responder 2 715.

In some embodiments, a Beamforming Report Poll frame may be sent by Initiator 705 to each Responder_k thereby facilitating responses by multiple responders to NDPA frame 720 and NDP frame 725. In general, in an environment with k responders, the RTT for the $k^{th}$ responder, given by RTT_k, may be calculated as: RTT_k=(T4_k−T1)−(T3_k−T2_k), where: T4_k is the time of reception of CBF frame from the $k^{th}$ responder at Initiator 705; T2_k is the time of reception of the corresponding $k^{th}$ BRP frame at the $k^{th}$ responder; and T3_k is the time at which the CBF frame from the $k^{th}$ responder is transmitted. As outlined above, the CBF frame from the $k^{th}$ responder may include CFI of Responder_k (CFI_k).

Figure 7B:
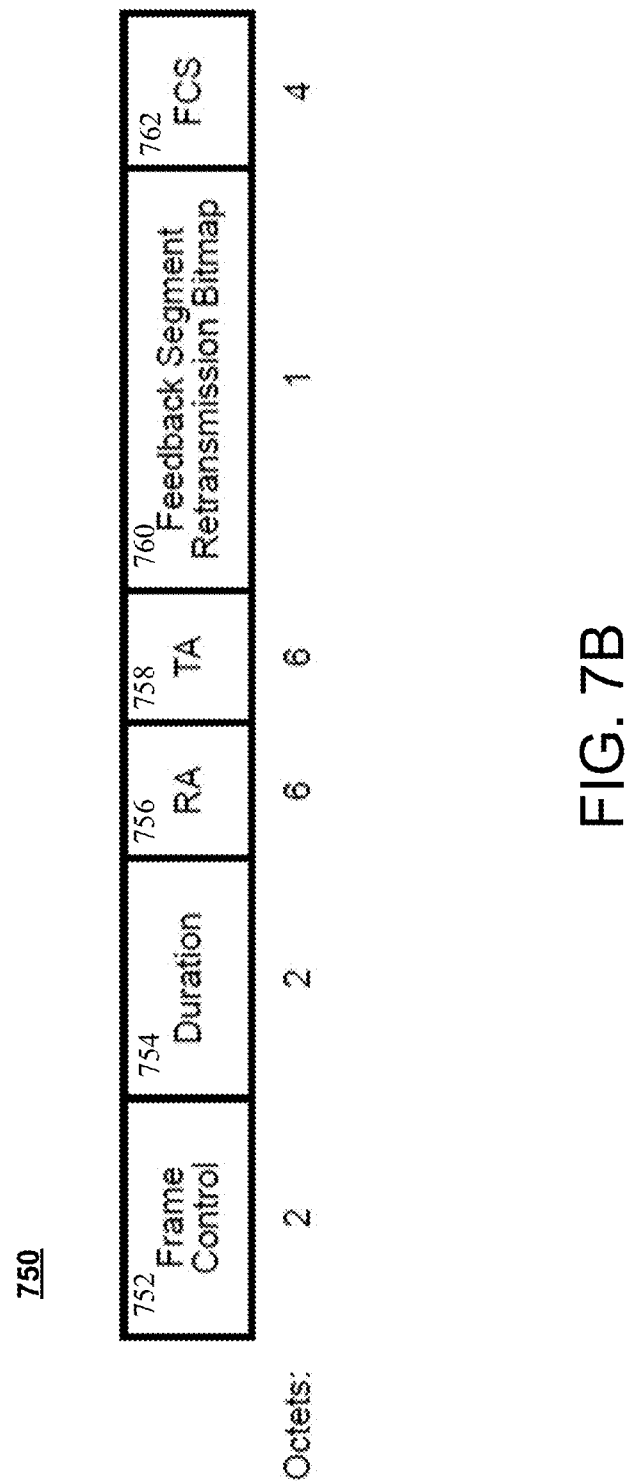
FIG. 7B shows a format for an example Beamforming Report Poll frame in accordance with certain embodiments presented herein.

FIG. 7B shows a format for an example Beamforming Report Poll frame in accordance with certain embodiments presented herein. In some embodiments, Beamforming Report Poll frame may include Frame Control field 752; Duration Field 754; RA (Recipient Address) field 756, which is set to the address of the intended recipient; TA (Transmitter Address) field 756, which may be set to the address of the STA transmitting the CBF Trigger; and Feedback Segment Retransmission Bitmap field 762, which indicates the requested feedback segments of a Very High Throughput (VHT) or HEW.

Figure 8A:
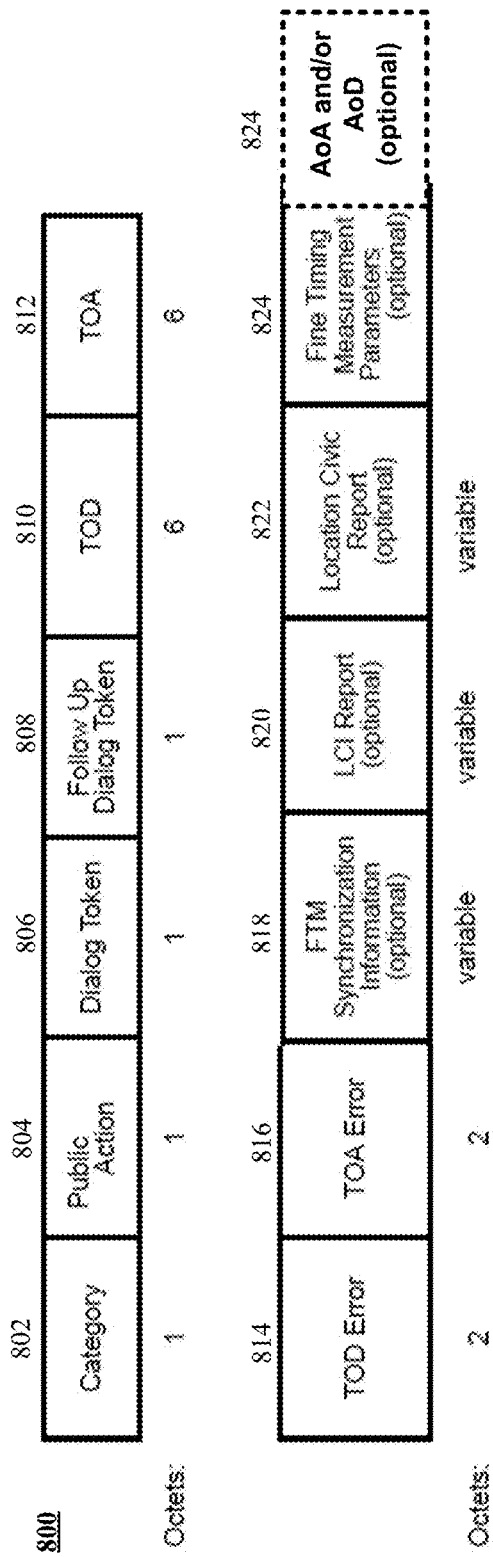
FIG. 8A shows an example Fine Timing Measurement (FTM) frame, which may include AoA, AoD, and/or other information in accordance with certain embodiments presented herein.
Figure 8B:
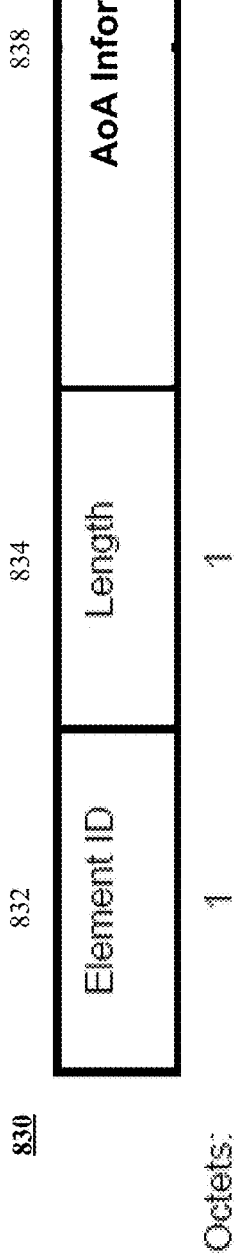
FIGS. 8B and 8C show the formats of example AoA field 830 and AoD field 840 in accordance with certain embodiments presented herein.

FIGS. 8A and 8B show an example Fine Timing Measurement (FTM) frame 800, which may include AoA, AoD, and/or other information in accordance with certain embodiments presented herein. In some embodiments, FTM No Ack frame and FTM Ack frames may take the form of FTM frame 800 with appropriate values of bits or fields in FTM frame 800. Accordingly, FTM frame 800 may be used in conjunction with the FTM, Ack, FTM No Ack, and FTM Ack message sequences/exchanges described herein.

As shown in FIG. 8A, FTM frame 800 may include fields Category 802, Public Action 804, Dialog Token 806, Follow Up Dialog Token 608, Time of Departure (TOD) 810, Time of Arrival (TOA) 812, TOD Error 814, TOA Error 816. FTM frame 800 may optionally include one or more of: FTM Synchronization Information 818, LCI Report 820 field, Location Civic Report field 822, and Fine Timing Measurement parameters field 824, which may be of variable length. The above fields are defined in the WLAN MAC & PHY Specifications.

Public Action 804 differentiates various Public Action frame formats. provides a mechanism for specifying various extended management actions. A values of 32 indicates an FTM Request, while a value of 33 indicates an FTM frame. Category 802 may specify a category of Public Action 804. For example, a Category value of 21 may indicate VHT. Dialog Token 806 may be a nonzero value chosen by a responding STA to identify an FTM No Ack/FTM frame as the first of a pair, with a second or follow-up FTM frame to be sent later. The Dialog Token field may be set to 0 to indicate the end of the FTM session.

The second or follow-up FTM frame of the pair may use the nonzero value of Dialog Token 806 in the last transmitted FTM frame in Follow Up Dialog Token 808 to indicate that: (i) the current (second) FTM/FTM Ack frame (of the pair) is a follow up FTM, and, (ii) TOD 810, TOA 812, TOD Error 814, and TOA Error 818 fields contain the values associated with timestamps captured with the first FTM/FTM No Ack frame of the pair. Follow Up Dialog Token 808 may be set to 0 to indicate that: (i) the current FTM/FTM No Ack frame is not a follow up; and (ii) TOD 810, TOA 812, TOD Error 814, and TOA Error 818 fields are reserved. TOD and TOA fields may be expressed in units of picoseconds.

In some embodiments, TOD 810 may include a timestamp that represents the time, with respect to a time base, at which the start of the preamble of the last transmitted FTM No Ack/FTM frame appeared at a transmit antenna connector of a transmitting STA.

In some embodiments, TOA 812 field may include a timestamp that represents the time, with respect to a time base, at which the start of the preamble of an FTM Ack/Ack frame to the last transmitted FTM No Ack/FTM frame arrived at the receive antenna connector of a receiving STA.

In some embodiments, FTM Synchronization Information 818 is present in the initial FTM frame and in any retransmissions.

Figure 8C:
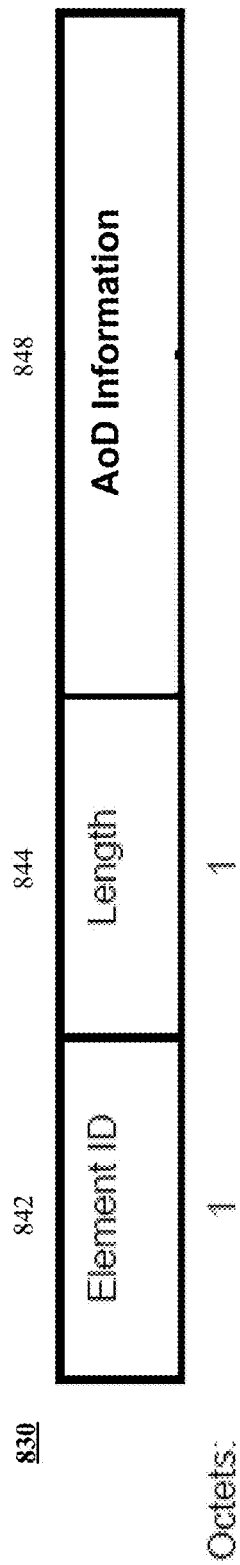

FIG. 8B shows the format of example AoA field 830, while FIG. 8C shows the format of example AoD field 840 according to certain embodiments disclosed herein. In some embodiments, AoA field 830 may include Element ID 832, Length 834, and AoA information 848. Similarly. in some embodiments, AoD field may include Element ID 842, Length 844, AoD information 848. In some implementations, the AoA Information may store values for Theta_AoA and Phi_AoA, as described below, in FIG. 8F to indicate angle of arrival information of a specified frame. In some implementations, the AoD field may store values for Theta_AoD and Phi_AoD to indicate angle of departure information of the specified frame.

In one embodiment, the TOD field 810 may include 6 bytes, the TOA field 812 may include 6 bytes, the AoA field (e.g. as a separate optional AoA field 830, or as part of FTM Parameters 824) may include 5 bytes, and the AoD field 613 (e.g. as a separate optional AoD field 840, or as part of FTM Parameters 824) may include 5 bytes (although for other embodiments, other field lengths may be used).

In some embodiments, AoA field 830 may include AoA information 838 for frames exchanged during a ranging operation, and the AoD field 840 may include AoD information 848 for frames exchanged during the ranging operation. For example, a responder may embed AoA information 838 into AoA field 830 (or another information element) serving as an AoA field of FTM frame 800, and may embed AoD information 848 of the FTM frame into AoD field 840 (or another information element serving as an AoD field of FTM frame 800). The responder device may also embed TOA information into the TOA field 812 of FTM frame 800, and may embed TOD information of into the TOD field 810 of FTM frame 800. The responder STA may then use the FTM frame 800 as an FTM No Ack frame ranging operations to transmit angle information (e.g., AoD and/or AoA) and time values to the initiator device. In some embodiments, in part, FTM No Ack frame may be compliant with existing standards/formats for FTM frames, thereby facilitating use of the frames in environments with a mix of legacy devices and devices that support the embedding, transmission and reception, of AoA, AoD, and other information in FTM (FTM No Ack) and/or FTM Ack frames.

In some embodiments, Element ID field 842 may store an element ID value indicating that AoA field 830 includes AoA information for a specified frame, while Length field 834 may store a value indicating a length (in bytes) of AoA field 830. In some embodiments, Element ID field 842 may store an element ID value indicating that AoD field 840 includes AoD information for a specified frame, while Length field 844 may store a value indicating a length (in bytes) of AoD field 840.

Figure 8D:
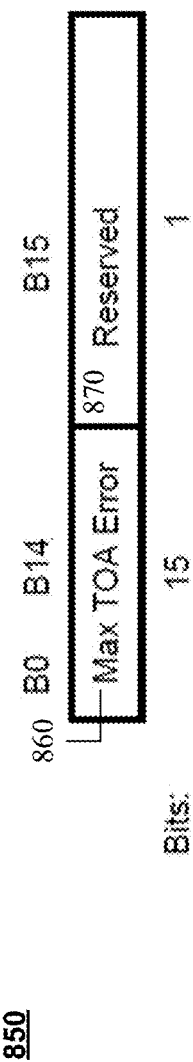
FIG. 8D shows an example Fine Timing Measurement (FTM) No Ack frame 800 indicating a request for an FTM Acknowledgement (FTM Ack).

FIG. 8D shows a portion 850 of an example Fine Timing Measurement (FTM)/FTM No Ack frame 800 indicating that a response may be sent as an FTM Acknowledgement (FTM Ack) frame. In some embodiments, a reserved bit in the FTM/FTM No Ack frame 800 may be set to indicate to a responder that a response with an FTM Ack frame is desired. In some embodiments, bit B15 870 of the Max TOA Error Field 860 may be used to indicate to a responder that a response with an FTM Ack frame is desired. The reserved bit (e.g. bit B15 870 of the Max TOA Error Field 860) in an FTM No Ack frame 800, which is used to indicate to a responder that a response with an FTM Ack frame is desired, is also referred to as an acknowledgment response bit herein.

Figure 8E:
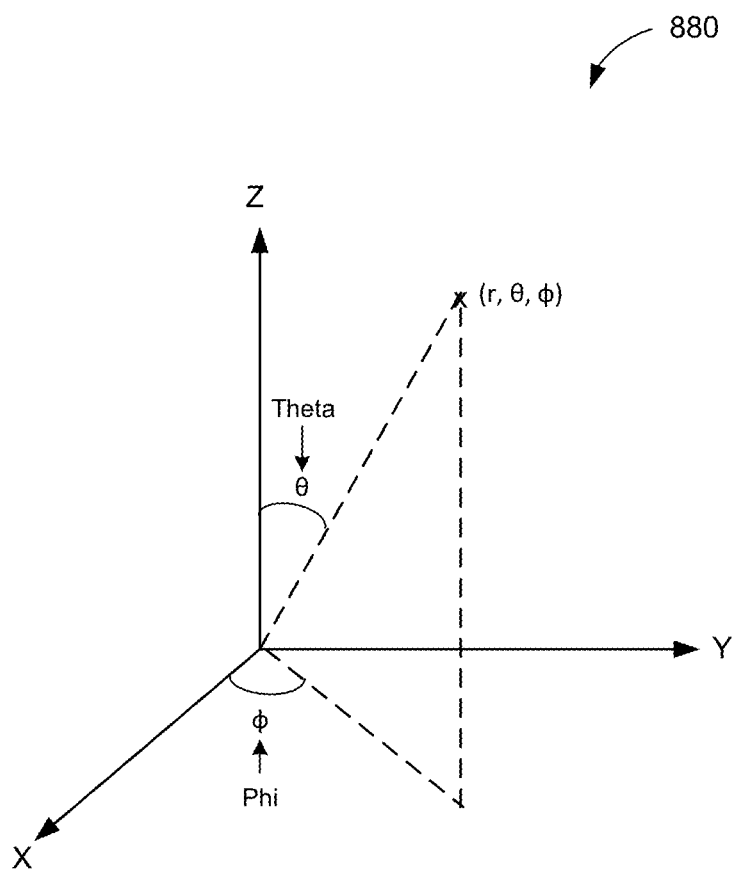
FIG. 8E is an example 3-dimensional coordinate system 880 for representing the position of a STA using a radius "r" and angles "theta" and "phi."

FIG. 8E is an example 3-dimensional coordinate system 880 for representing the position of a STA using a radius "r" and angles "theta" and "phi." As depicted in FIG. 8A, phi may be an angle with respect to the horizontal (x-y) plane, while theta may be an angle with respect to the vertical (z) axis. Phi may range from 0° to 360°, while theta may range from 0° to 180°. The radius r is the distance between the origin and a point coordinate (r, θ, and φ) representing the location of a wireless device relative to the origin. In some implementations, the AoA field may store values for Theta_AoA and Phi_AoA to indicate angle of arrival information of a specified frame. In some implementations, the AoD field may store values for Theta_AoD and Phi_AoD to indicate angle of departure information of the specified frame.

Thus, disclosed embodiments include the use of FTM frame 800, which, in some embodiments, may take the form of a conventional FTM frame. In some embodiments, FTM frame 800 may include AoA, AoD and other information. For example, FTM Measurement parameter 824, additional optional AOA and/or AoD fields, may comprise AoA, AoD, and/or other parameters. In some embodiments, FTM Measurement Parameters 824 may be used to carry information pertaining to AoA, AoD, and/or other parameters.

In some embodiments, separate optional AoA and/or AoD fields may be provided in FTM frame 800. The AoA and/or AoD fields may carry AoA and/or AoD information. FTM frame 800 may include other bits, fields etc to indicate when FTM frame 800 includes additional information. In some embodiments, the AoA, AoD, FTM Ack and other information may be included in a manner so that legacy devices may continue to function normally. For example, in some embodiments, where the responder device may be an access point STA, the responder device may embed, into a beacon or other frame, information indicating whether the responder device is capable of including AoA and/or AoD information in one or more frames exchanged between the initiator device and the responder device. In some aspects, this information may be embedded within an information element (IE) or a vendor-specific information element (VSIE) of the beacon frame or other frame.

Further, in some embodiments, FTM frame 800 may (alternatively or additionally) take the form of an FTM No Ack or FTM Ack frame. For example, as shown in FIG. 8C, a reserved bit or acknowledgment response bit in the FTM No Ack frame 800 may be set to indicate to a responder that a response with an FTM Ack frame is desired.

In some embodiments, the first 12 bits of the AoA information field 838 may be used to indicate a value for Theta_AoA, and the second 12 bits of the AoA information field may be used to indicate a value for Phi_AoA. Similarly, the first 12 bits of the AoD information field 848 may be used to indicate a value for Theta_AoD, and the second 12 bits of the AoD information field 848 may be used to indicate a value for Phi_AoD. In embodiments, where 12-bit values are used, the 12-bit values for Theta_AoA and Theta_AoD may provide a resolution of approximately 0.044° (180° divided by (212−1)), while the 12-bit values for Phi_AoA and Phi_AoD may provide a resolution of approximately 0.088° (360° divided by (212−1)).

FTM frames formatted according to current FTM protocols (e.g., as defined by the IEEE 802.11REVmc standards) include a 6-byte TOD field 810 and a 6-byte TOA field 812 to store TOD and TOA information, respectively—e.g. to embed timestamp values $t_{1\_TOD}$ and $t_{2\_TOA}$, where $t_{1\_TOD}$ is the time of departure of a first frame, and $t_{2\_TOA}$ is the time of arrival of a corresponding response frame, where the first frame and corresponding response frame are used to measure RTT. In some embodiments, because RTT may be determined using a single time difference value ($t_{2\_TOA} - t_{1\_TOD}$) rather than two individual timestamp values (e.g., one of the TOD 810 or TOA 812 fields may be repurposed to store AoA and AoD information, thereby eliminating the need for an FTM frame to include a separate field that stores AoA and AoD information (and thus reducing the size of the FTM frame). For example, as indicated above, RTT may be determined as ($t_{2\_TOA} - t_{1\_TOD}$), where $t_{1\_TOD}$ is the time of departure of a first frame, and $t_{2\_TOA}$ is the time of arrival of a corresponding response/acknowledgment frame, where the first frame and corresponding response/acknowledgment frame are used for ranging, including measuring RTT.

Figure 9A:
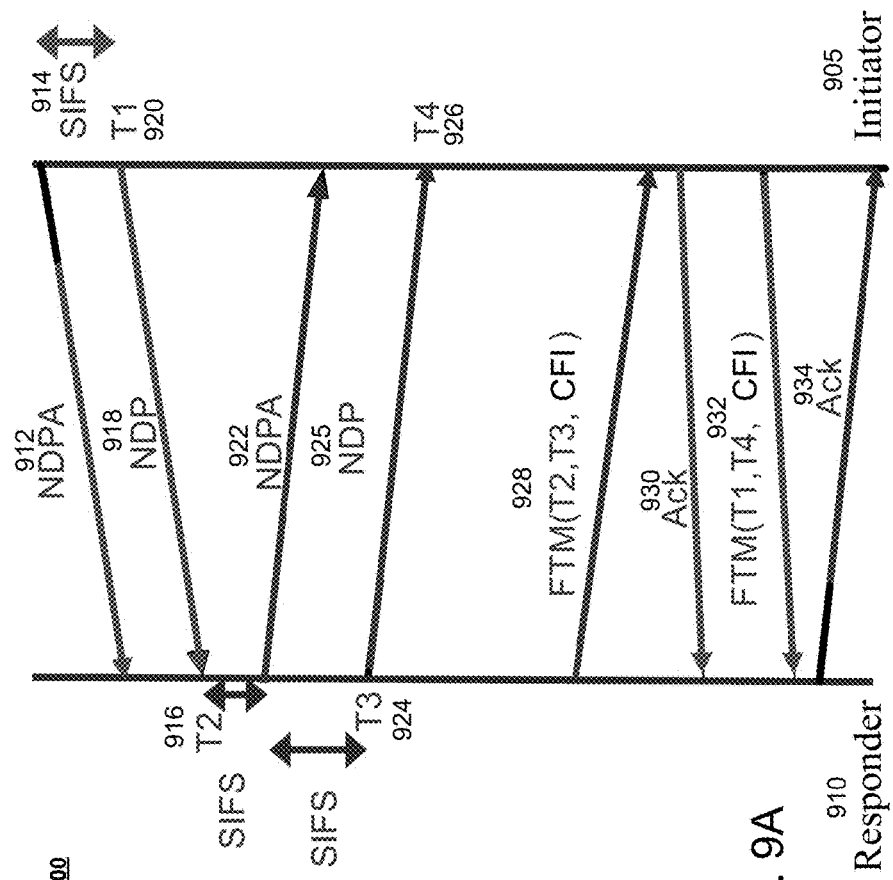
FIG. 9A shows an example symmetric unicast message flow between an initiator (e.g. AP 240) and a responder (e.g. UE 100) with FTM frames include a CFI field in accordance with certain embodiments presented herein.

FIG. 9A shows an example symmetric message flow between an initiator (e.g. AP 240) and a responder (e.g. UE 100). For example, a first bit in Reserved subfield 432 (FIG. 4B) in NDPA frame 912 may be used by Initiator 905 to indicate to Responder 910 that immediately subsequent NDP frame 918 is to be used for ranging. Further, a second bit in Reserved subfield 432 (FIG. 4B) in NDPA frame 912 may be used by Initiator 905 to indicate to Responder 910 that Initiator 905 can share ranging information.

As shown in FIG. 9A, NDPA frame 912 may be sent by Initiator 905. NDPA frame 912 may be followed by transmission of NDP frame 918 at time T1 920 after a time interval given by SIFS 914 measured from the end of transmission of NDPA frame 912. Initiator 905 may record the time of transmission of NDP frame 912 at time T1 920. Responder 910 may record the time of reception of NDP frame 912 at time T2 916.

Further, as shown in FIG. 9A, NDPA frame 922 (e.g. with broadcast bit in Reserved subfield 432 set to 1) may be sent by Responder 910. For example, a first bit in Reserved subfield 432 (FIG. 4B) in NDPA frame 922 may be used by Responder 910 to indicate to Initiator 905 that immediately subsequent NDP frame 925 is to be used for ranging. Further, a second bit in Reserved subfield 432 (FIG. 4B) in NDPA frame 922 may be used by Responder 910 to indicate to Initiator 905 to that Responder 910 can share ranging information.

NDPA frame 922 may be followed by transmission of NDP frame 925 at time T3 924 after a time interval given by SIFS measured from the end of transmission of NDPA frame 922. Responder may record the time of transmission of NDP frame 925 at time T3 924. Initiator 905 may record the time of reception of NDP frame 925 at time T4 926.

Responder 910 may respond to NDP frame 918 with FTM frame 928, which may include time T2 916, time T3 924, and the CFI. Initiator 905 may respond with an Acknowledgement (Ack) message 930. Further, Initiator 904 may respond to NDP frame 925 with FTM frame 932, which may include time T1 920, time T4 926, and the CFI. Responder 910 may respond with an Acknowledgement (Ack) message 934. In some embodiments, RTT, TDOA, and/or other calculations may be performed by Initiator 905 and/or Responder 910 based on the recorded and received information.

In some embodiments, instead of sending of FTM frame 928 (as shown in FIG. 9A), Responder 910 may send a FTM No Ack frame with FTM Ack bit set to 1 with time T2 916, time T3 924, and the CFI; and Initiator 905 may respond with an FTM Ack frame (instead of Ack frame 930) including time T1 920, time T4 926, and the CFI. Thus, Ack frames 930 and 934 may be obviated thereby speeding up the exchange of information for RTT, TDOA, and/or other calculations related to the FTM sessions.

Figure 9B:
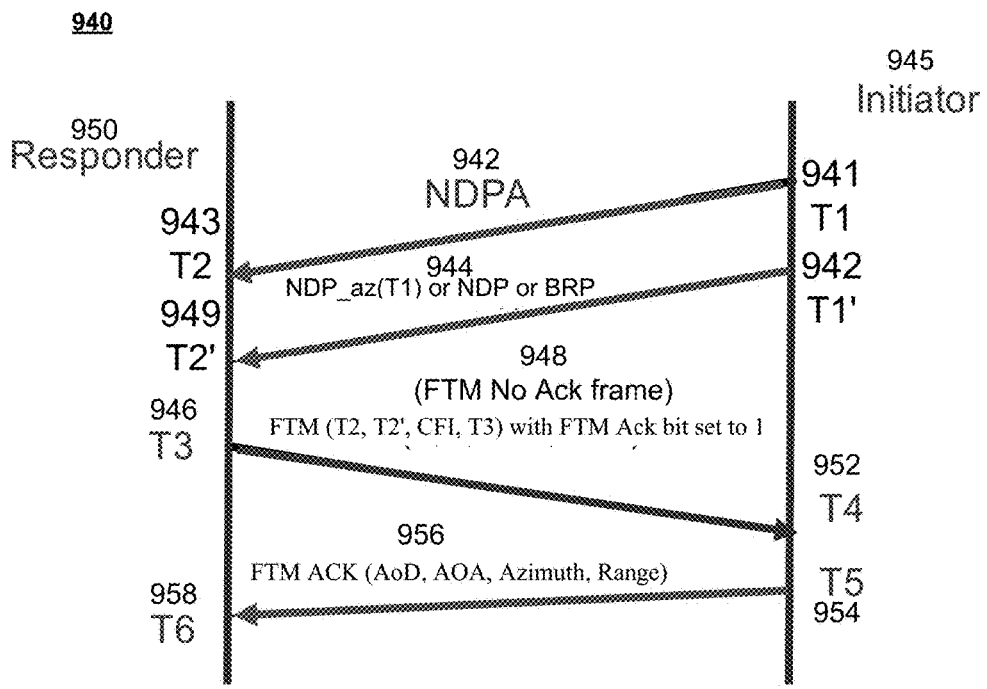
FIG. 9B shows an example unicast message flow between an initiator (e.g. AP 240) and a responder (e.g. UE 100) where FTM frames include a CFI field, an Angle of Arrival (AoA) field and/or an Angle of Departure (AoD) field and/or an Azimuth field and/or a Range field in accordance with certain embodiments presented herein.

FIG. 9B shows an example message flow between an initiator (e.g. AP 240) and a responder (e.g. UE 100).

As shown in FIG. 9B, NDPA frame 942 may be sent by Initiator 945 at time T1 941. NDPA frame 942 may be followed by transmission of frame 944 at time T1' 942 after a time interval given by SIFS 914 measured from the end of transmission of NDPA frame 942. Initiator 945 may record the time of transmission T1 of NDPA frame 942 and the time of transmission T1' of frame 944. In some embodiments, frame 944 may be one of: an NDP_az frame with time T1 947, or an NDP frame 944 or a Beam Refinement Protocol (BRP) frame. NDPA frame 942 may be received by Responder 950 at time T2 943, while frame 944 may be received by Responder 950 at time T2' 949.

Responder 950 may respond to frame 942 with FTM No Ack frame 948. FTM No Ack frame 948 may have FTM Ack bit set to 1. FTM No Ack frame 948 may include time T2 943, time T2' 949, CFI, and time T3 948 information. Responder 950 may record the time T3 946 of transmission of FTM No Ack frame 948. In some embodiments, FTM No Ack frame 948 may request AoD, AoA, Azimuth, or Range information.

In some embodiments, an FTM request frame may be used, alternatively, to request AoD, AoA, Azimuth, or Range information. In embodiments where an FTM Request frame requesting AoD, AoA, Azimuth, and/or Range information is sent instead of a FTM No Ack frame, then, an Ack frame may be sent by Responder 950 (instead of an FTM ACK frame).

Initiator 945 may record the time T4 952 of arrival of FTM Ack frame 948. Initiator 945 may respond with FTM Ack frame 956, which includes an ACK. In some embodiments, FTM ACK frame 956 may include one or more of AoD, AoA, Azimuth, and Range information. In some embodiments, information included in FTM ACK frame 956 may be based, in part, on information requested in FTM frame 948. Responder 950 may record the time T6 958 of arrival of Ack message 956.

When Initiator 945 and Responder 950 are synchronized the Time of Flight may be calculated as: (a) the difference of times T2 943 and T1 941, (T2−T1); or (b)

$$\frac{(T2-T1)+(T2'-T1')}{2}.$$

When Initiator 945 and Responder 950 are not synchronized, the TOF may be calculated as $$TOF = \frac{RTT}{2} = \frac{(T4-T1')-(T3-T2')}{2}.$$

Figure 9C:
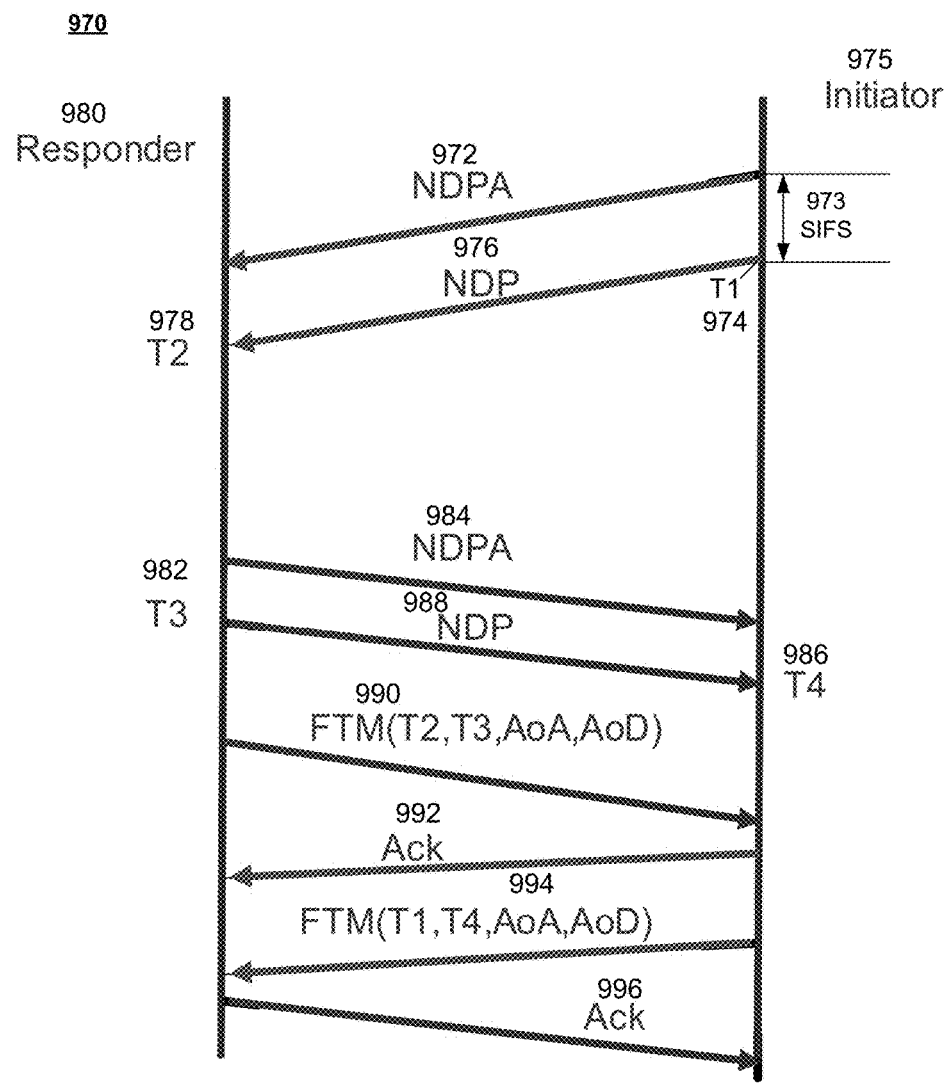
FIG. 9C shows an example symmetric message flow between an initiator (e.g. AP 240) and a responder (e.g. UE 100) where an NDPA announces a broadcast NDP and FTM frames include an Angle of Arrival (AoA) field and/or an Angle of Departure (AoD) field in accordance with certain embodiments presented herein.

FIG. 9C shows an example symmetric message flow between an initiator (e.g. AP 240) and a responder (e.g. UE 100) where an NDPA announces a symmetric request.

As shown in FIG. 9C, NDPA frame 972 may be sent by Initiator 975. NDPA frame 972 may be followed by transmission of NDP frame 976 at time T1 974 after a time interval given by SIFS 973 measured from the end of transmission of NDPA frame 972. For example, a first bit in Reserved subfield 432 (FIG. 4B) may be used by Initiator 975 to indicate to Responder 980 that immediately subsequent NDP frame 976 is to be used for ranging. Further, NDPA frame 972 may include a single STA Info field 435 (indicating unicast) and the RA field 420 may be set to the address of Responder 980. Initiator may record the time of transmission of NDP frame 972 at time T1. Responder 980 may record the time of reception of NDP frame 972 at time T2 978.

Further, as shown in FIG. 9C, NDPA frame 984 may be sent by Responder 980. NDPA frame 984 may be followed by transmission of NDP frame 988 at time T3 982 after a time interval given by SIFS measured from the end of transmission of NDPA frame 984. For example, a first bit in Reserved subfield 432 (FIG. 4B) in NDPA frame 984 may be used by Responder 980 to indicate to Initiator 975 that immediately subsequent NDP frame 988 is to be used for ranging. Further, a second bit in Reserved subfield 432 (FIG. 4B) in NDPA frame 984 may be used by Responder 980 to indicate to Initiator 975 to that Responder 980 can share ranging information. Responder 980 may record the time of transmission of NDP frame 988 at time T3 982. Initiator 975 may record the time of reception of NDP frame 988 at time T4 986.

Responder 980 may respond to NDP frame 976 with FTM frame 990, which may include time T2 978, time T3 982, AoA, and AoD. Initiator 975 may respond with Acknowledgement (Ack) message 992. Further, Initiator 975 may respond to NDP frame 988 with FTM frame 994, which may include time T1 974, time T4 986, AoA, and AoD. Responder 980 may respond with Ack message 996. In some embodiments, RTT, TDOA, and/or other calculations may be performed by Initiator 975 and/or Responder 980 based on the recorded and received information.

In some embodiments, instead of sending of FTM frame 990 (as shown in FIG. 9C), Responder 980 may send a FTM No Ack frame with FTM Ack bit set to 1 with time T2 978, time T3 982, AoA, and AoD, and Initiator 975 may respond with an FTM Ack frame (instead of Ack message 992) including time T1 974, time T4 986, AoA, and AoD. Thus, Ack messages 992 and 996 may be obviated thereby speeding up the exchange of information for RTT, TDOA, and/or other calculations related to the FTM sessions.

Figure 10:
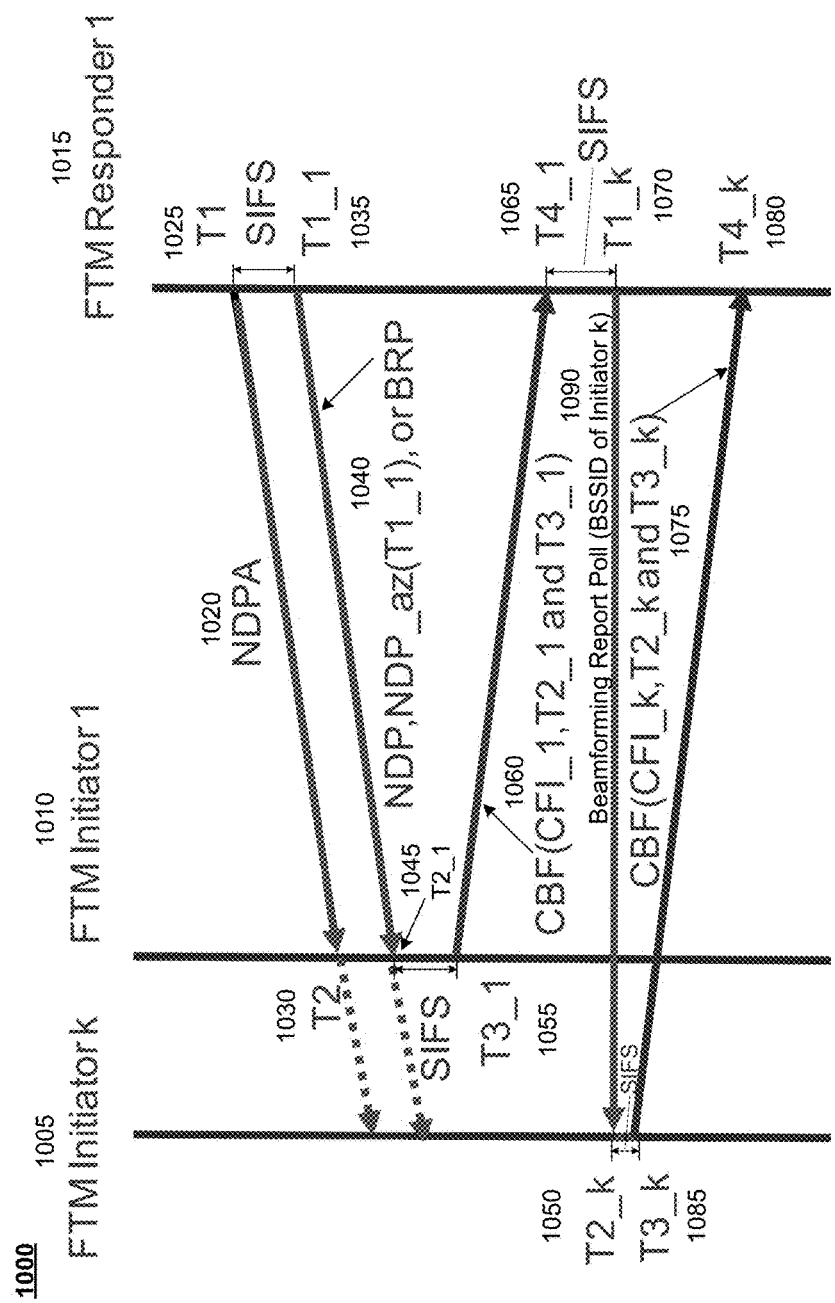
FIG. 10 shows a multicast non-symmetric message flow 1000 with multiple initiators where the FTM Responder does not share information.

FIG. 10 shows a multicast non-symmetric message flow 1000 with multiple FTM initiators where the FTM Responder does not share information. For example, a first bit in Reserved subfield 432 (FIG. 4B) in NDPA frame 1020 may be used by FTM Responder 1015 to indicate to FTM Initiators that the immediately subsequent frame 1040 is to be used for ranging. Further, a second bit in Reserved subfield 432 (FIG. 4B) in NDPA frame 1020 may be used by FTM Responder 1015 to indicate to FTM Initiators to that FTM Responder 1015 does not share ranging information. As shown in FIG. 10, NDPA frame 1020 may be sent by FTM Responder 1 1015 at time T1 1025. FTM Responder 1 1015 may record the time of transmission of NDPA frame at time T1 1025. NDPA frame 1020 may be received by FTM Initiator 1 1010 at time T2 1030. Time T2 1030 may be recorded by FTM Initiator 1010.

NDPA frame 1020 may be followed by transmission (by FTM Responder 1 1015) of frame 1040 at time T1_1 1035 after a time interval given by SIFS measured from the end of transmission of NDPA frame 1020. Frame 1040 may take the form of an NDP_az frame with time T1_1 1035, an NDP frame, or a Beam Refinement Protocol (BRP) frame. Frame 1040 may be received by FTM Initiator 1 1010 at time T2_1 1045. Time 2_1 1045 may be recorded by FTM Initiator 1 1010.

After a SIFS interval following the end of reception of frame 1040, at time T3_1 1055, FTM Initiator 1 1010 may transmit CBF 1060 with the CFI of Responder 1 CFI_1, time T2_1 1045, and time T3_1 1055. CBF 1060 may be received by FTM Responder 1 1015 at time T4_1 1065.

After a SIFS time interval, FTM Responder 1 1015 may transmit Beamforming Report Poll (BSSID k) frame 1090 with the BSSID of FTM Initiator k 1005, where k≥2 is some integer. FTM Initiator k 1005 may receive Beamforming Report Poll (BSSID k) frame 1090 at time T2_k 1050. After a SIFS interval following the end of reception of frame 1090, at time T3_k 1085, FTM Initiator k 1005 may transmit CBF 1075 with CFI_k, time T2_k 1050, and time 3_k 1075. CBF 1070 may be received by FTM Responder 1 at time T4_k 1080. In some embodiments, as shown in the message exchange in FIG. 10, time T4_k 1080 may not be sent to FTM Initiator k.

Figure 11:
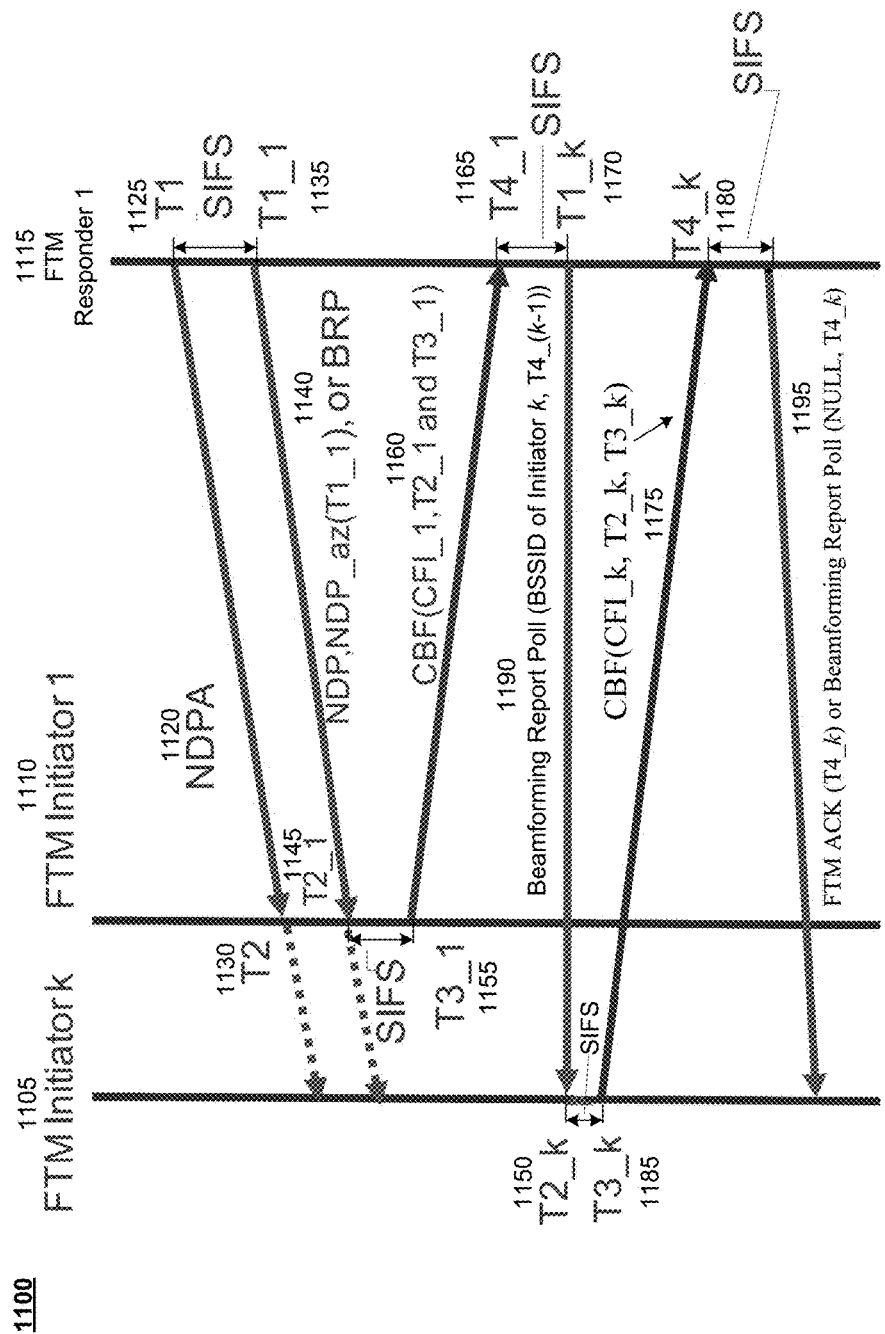
FIG. 11 shows a multicast symmetric message flow 1100 with multiple initiators where the FTM Responder shares information.

FIG. 11 shows a multicast symmetric message flow 1100 with multiple initiators where the FTM Responder shares information. As shown in FIG. 11, NDPA frame 1120 may be sent by FTM Responder 1 1115 at time T1 1125. FTM Responder 1 may record the time of transmission of NDPA frame at time T1 1125. NDPA frame 1120 may be received by FTM Initiator 1 1110 at time T2 1130. Time T2 1130 may be recorded by FTM Initiator 1110.

NDPA frame 1120 may be followed by transmission (by FTM Responder 1 1115) of frame 1140 at time T1_1 1135 after a time interval given by SIFS measured from the end of transmission of NDPA frame 1120. Frame 1140 may take the form of an NDP_az frame with time T1_1 1135, an NDP frame, or a BRP frame. Frame 1140 may be received by FTM Initiator 1 1110 at time T2_1 1145. Time 2_1 1145 may be recorded by FTM Initiator 1 1110.

After a SIFS interval following the end of reception of frame 1140, at time T3_1 1155, FTM Initiator 1 1110 may transmit CBF 1160 with CFI_1, time T2_1 1145, and time T3_1 1155. CBF 1160 may be received by FTM Responder 1 1115 at time T4_1 1165.

After a SIFS time interval, FTM Responder 1 1115 may transmit Beamforming Report Poll (BSSID k, T4_(k−1)) frame 1190 with the BSSID of FTM Initiator k 1105, where k≥2 is some integer, and T4_k. For example, after a SIFS time interval, FTM Responder 1 1115 may transmit Beamforming Report Poll (BSSID k=2, T4_1) frame 1190 with the BSSID of FTM Initiator k=2 and T4_1.

FTM Initiator k 1105 may receive Beamforming Report Poll (BSSID k, T4_(k−1)) frame 1190 at time T2_k 1150. After a SIFS interval following the end of reception of frame 1190, at time T3_k 1185, FTM Initiator k 1105 may transmit CBF 1175 with CFI_k, time T2_k 1150, and time T3_k 1175. CBF 1170 may be received by FTM Responder 1 at time T4_k 1180.

After a SIFS time interval following the end of reception of CBF 1175, FTM Responder 1 1115 may transmit frame 1195. Frame 1195 may take the form of an FTM ACK frame with time T4_k 1180 or a Beamforming Report Poll (NULL, T4_k) frame with time T4_k 1180.

Round trip time for the $k^{th}$ FTM Initiator (RTT_k) may be computed as (T4_k−T1_1)−(T3_k−T2_k) by both FTM Responder 1 1115 and FTM Initiator k 1105.

Figure 12:
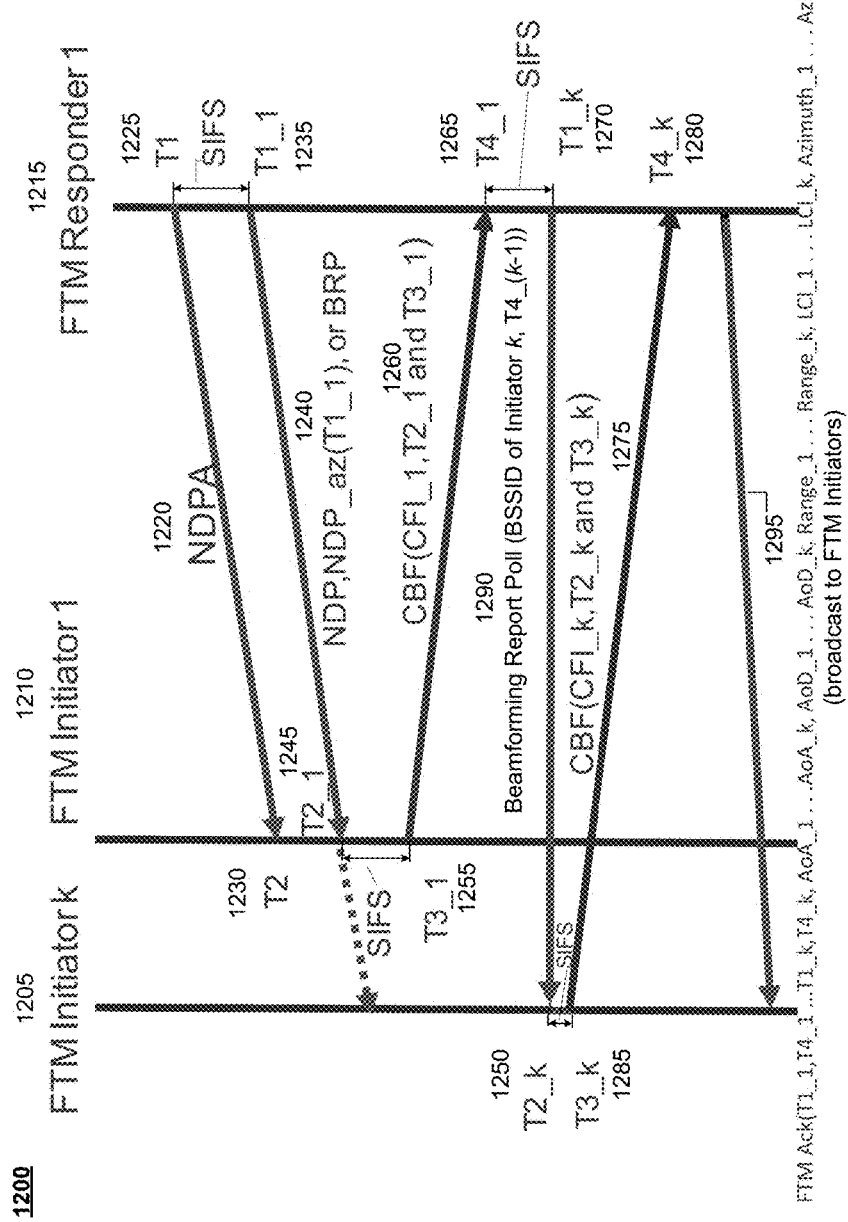
FIG. 12 shows a multicast symmetric message flow 1200 with multiple initiators with the ranging bit set.

FIG. 12 shows a multicast symmetric message flow 1200 with multiple initiators with the ranging bit set. As shown in FIG. 12, NDPA frame may be sent by FTM Responder 1 1215 at time T1 1225. FTM Responder 1 may record the time of transmission of NDPA frame at time T1 1225. NDPA frame 1220 may be received by FTM Initiator 1 1210 at time T2 1230. Time T2 1230 may be recorded by FTM Initiator 1210.

NDPA frame 1220 may be followed by transmission (by FTM Responder 1 1215) of frame 1240 at time T1_1 1235 after a time interval given by SIFS measured from the end of transmission of NDPA frame 1220. Frame 1240 may take the form of an NDP_az frame with time T1_1 1235, an NDP frame, or a BRP frame. Frame 1240 may be received by FTM Initiator 1 1210 at time T2_1 1245. Time 2_1 1245 may be recorded by FTM Initiator 1 1210.

After a SIFS interval following the end of reception of frame 1240, at time T3_1 1255, FTM Initiator 1 1210 may transmit CBF 1260 with CFI_1, time T2_1 1245, and time T3_1 1255. CBF 1260 may be received by FTM Responder 1 1215 at time T4_1 1265.

After a SIFS time interval, FTM Responder 1 1215 may transmit Beamforming Report Poll (BSSID of Initiator k, T4_(k−1)) frame 1290 with the BSSID of FTM Initiator k 1205, where k≥2 is some integer and with time T4_(k−1) 1265. For example, after a SIFS time interval, FTM Responder 1 1215 may transmit Beamforming Report Poll (BSSID k=2, T4_1) frame 1190 with the BSSID of FTM Initiator k=2 and T4_1.

FTM Initiator k 1205 may receive Beamforming Report Poll (BSSID of Initiator k, T4_(k−1)) frame 1290 at time T2_k 1250. After a SIFS interval following the end of reception of frame 1290, at time T3_k 1285, FTM Initiator k 1205 may transmit CBF 1275 with CFI_k, time T2_k 1250, and time 3_k 1275. CBF 1270 may be received by FTM Responder 1 at time T4_k 1280.

After a SIFS time interval following the end of reception of CBF 1275, FTM Responder 1 1215 may transmit frame 1295. Frame 1295 may take the form of an FTM ACK frame. In some embodiments, FTM ACK frame 1295 may be similar in format to an FTM frame, but may be broadcast to FTM Initiators and heard by FTM Initiators.

At a time after T4_k, FTM Responder 1 1215 may transmit FTM ACK frame 1295 with T1_1, T4_1 . . . T1_k, T4_k, AoA_1 . . . AoA_k, AoD_1 . . . AoD_k, Range_1 . . . Range_k, LCI_1 . . . LCI_k and Azimuth_1 . . . Azimuth_k. In some embodiments, FTM Ack frame 1295 may be a broadcast frame that contains AOD, AOA for each FTM Initiator. AoA_j refers to the Angle of Arrival of CBF frame from FTM Initiator j. AoD_j refers to the Angle of Departure of CBF frame from FTM Initiator j. Range_j, LCI_j and Azimuth_j, are the range, location context identifier and azimuth for FTM Initiator j, respectively, where 1≤j≤k. In some embodiments, FTM Ack frame 1295 may not transmitted be within a SIFS time interval of reception of CBF with CFI_k and other information related to FTM Initiator k. In some embodiments, FTM Ack frame 1295 may include vector entries which contain information relevant to the various FTM initiators.

Round trip time for the $k^{th}$ FTM Initiator (RTT_k) may be computed as (T4_k−T1_1)−(T3_k−T2_k) by both FTM Responder 1 1215 and FTM Initiator k 1205.

Figure 13:
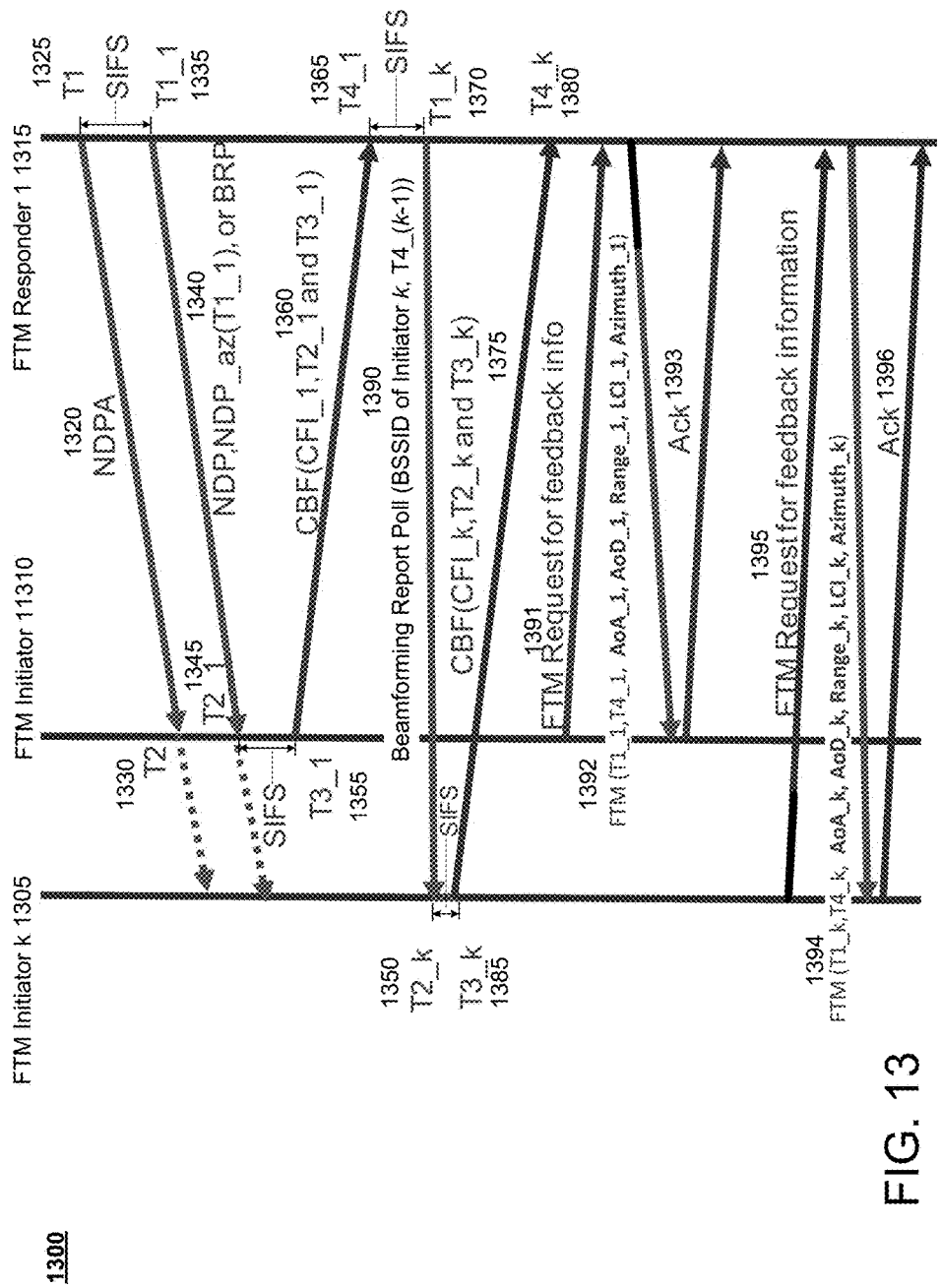
FIG. 13 shows a multicast symmetric message flow 1300 with multiple initiators with the ranging bit not set.

FIG. 13 shows a multicast symmetric message flow 1300 with multiple initiators with the ranging bit (e.g. in Reserved subfield 432 in FIG. 4B) not set. As shown in FIG. 13, NDPA frame 1320 may be sent by FTM Responder 1 1315 at time T1 1325. FTM Responder 1 1315 may record the time of transmission of NDPA frame at time T1 1325. NDPA frame 1320 may be received by FTM Initiator 1 1310 at time T2 1330. Time T2 1330 may be recorded by FTM Initiator 1310.

NDPA frame 1320 may be followed by transmission (by FTM Responder 1 1315) of frame 1340 at time T1_1 1335 after a time interval given by SIFS measured from the end of transmission of NDPA frame 1320. Frame 1340 may take the form of an NDP_az frame with time T1_1 1335, an NDP frame, or a BRP frame. Frame 1340 may be received by FTM Initiator 1 1310 at time T2_1 1345. Time 2_1 1345 may be recorded by FTM Initiator 1 1310.

After a SIFS interval following the end of reception of frame 1340, at time T3_1 1355, FTM Initiator 1 1310 may transmit CBF 1360 with CFI_1, time T2_1 1345, and time T3_1 1355. CBF 1360 may be received by FTM Responder 1 1315 at time T4_1 1365.

After a SIFS time interval, at time T1_k 1370, FTM Responder 1 1315 may transmit Beamforming Report Poll (BSSID of Initiator k, T4_(k−1)) 1390 with the BSSID of FTM Initiator k 1305, where k≥2 is some integer and with time T4_1 1365. FTM Initiator k 1305 may receive Beamforming Report Poll (BSSID of Initiator k, T4_(k−1)) frame 1390 at time T2_k 1350. After a SIFS interval following the end of reception of frame 1390, at time T3_k 1385, FTM Initiator k 1305 may transmit CBF 1375 with CFI_k, time T2_k 1350, and time 3_k 1375. CBF 1370 may be received by FTM Responder 1 at time T4_k 1380.

In some embodiments, after time T4_K 1380, FTM Initiator 1 1310 may transmit FTM Request for feedback information 1391 and FTM Responder 1 1315 may respond with FTM frame 1392 with information, including time T1_1 1335, time T4_1 1365, AoA_1, AoD_1, Range_1, LCI_1, Azimuth_1, for FTM Initiator 1 1310. FTM Initiator 1 may respond with Ack frame 1393.

Similarly, any FTM Initiator k desiring feedback information may transmit FTM Request for feedback information 1395 and FTM Responder 1 1315 may respond with FTM frame 1394 with information, including time T1_k 1370, time T4_k 1380, AoA_k, AoD_k, Range_k, LCI_k, Azimuth_k, for FTM Initiator k 1305. FTM Initiator k may respond with Ack frame 1396.

The round trip time for the $k^{th}$ FTM initiator, (RTT_k) may be computed as (T4_k−T1_1)−(T3_k−T2_k) by both FTM Responder 1 1315 and FTM Initiator k 1305.

In FIG. 13, feedback is in the form of unicast FTM sessions for each FTM Initiator, which facilitates FTM initiator control over reception of feedback information. For example, FTM Initiators may control whether they receive feedback information.

Figure 14A:
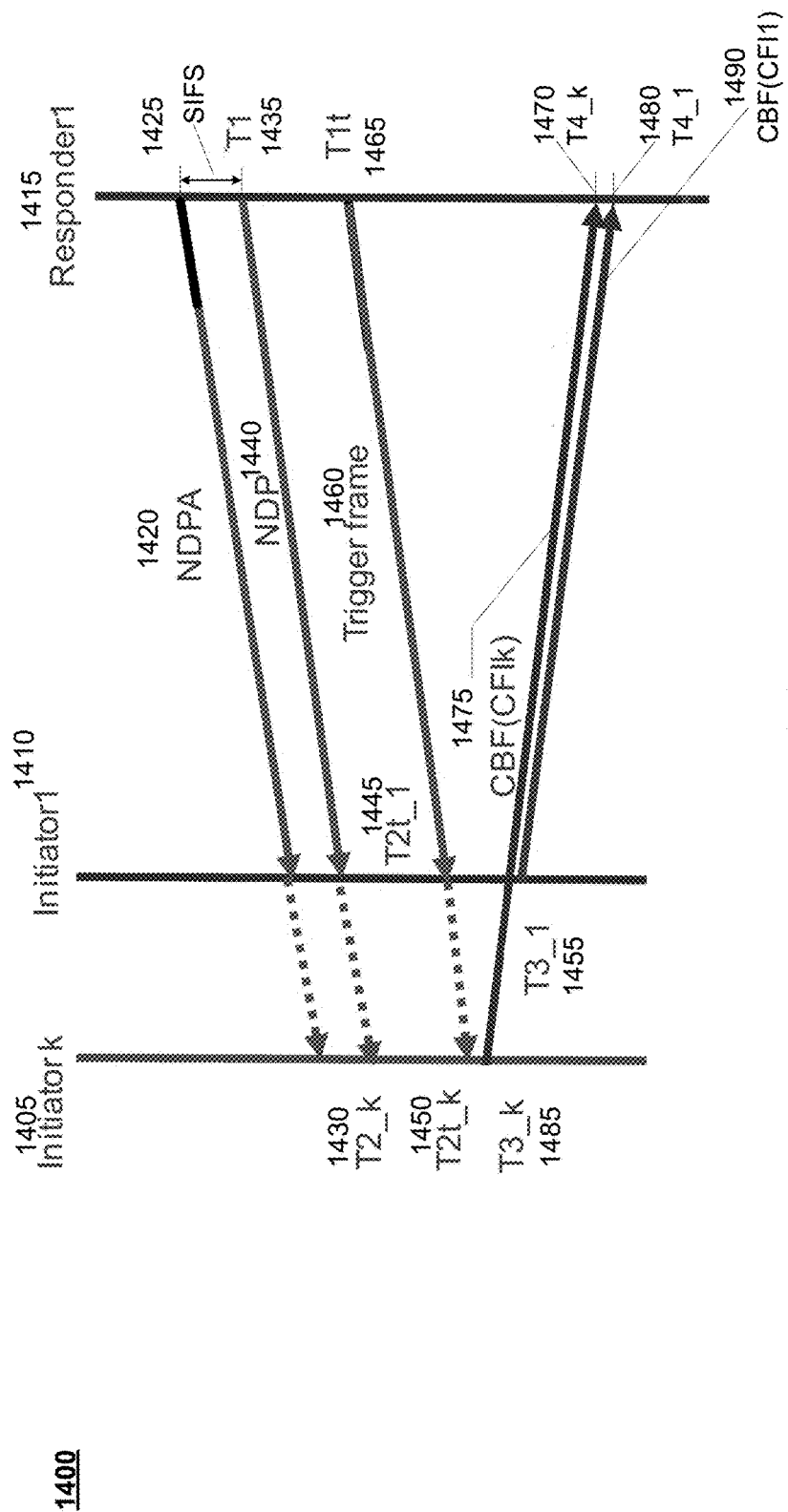
FIG. 14A shows a multicast symmetric Orthogonal Frequency Division Multiple Access (OFDMA) or downlink Multi User MIMO message flow 1400 with multiple initiators where information for all initiators is received within a SIFS interval.

FIG. 14A shows a multicast symmetric Orthogonal Frequency Division Multiple Access (OFDMA) message flow 1400 with multiple initiators where information for all initiators is received within a SIFS interval. In FIG. 14A, the Responder does not share information. In FIG. 14A, OFDMA is used and synchronization between initiators and responders may be facilitated by exchanges of information and/or frames between initiators and responders. In contrast, some schemes, which respond to a multi-user NDP frame from an AP using time multiplexed responses by responders, may fail to maintain adequate synchronization because of a lack of transmissions by the AP.

As shown in FIG. 14A, NDPA frame 1420 (e.g. with broadcast bit in Reserved subfield 432 set to 1) may be sent by Responder 1 1415. NDPA frame 1420 may be received by Initiator 1 1410 through Initiators k 1405

NDPA frame 1320 may be followed by transmission (by Responder 1 1415) of NDP frame 1440 at time T1 1425 after a time interval given by SIFS measured from the end of transmission of NDPA frame 1420. NDP Frame 1440 may be received by Initiators k at times given by T2_1, T2_2, . . . T2_k, respectively.

After a SIFS interval from the end of transmission of NDP frame 1440, Trigger frame 1460 may be transmitted by Responder 1 1415 at time T1t 1465 and received by Initiators k at times given by T2t_1 1445, T2t_2, . . . T2t_k 1450, respectively.

After a SIFS interval from the end of reception of trigger frame 1460, CBF frames CBF(CFI1) 1490, CBF (CFI2), . . . CBF(CFI_k) 1475 may be transmitted at times t3_1 1455, t3_2, . . . t3_k 1485. The CBF frames are received by Responder 1 1415 at times T4_1 1480, T4_2, . . . T4_k 1470. In some embodiments, the CBF frames may be multiplexed using OFDMA or uplink multi-user MIMO (UL MU-MIMO).

Round trip time for the $k^{th}$ initiator RTT_k may be computed as: (T4_k−T1t)−(T3_k−T2_k) by Responder 1 1415.

Figure 14B:
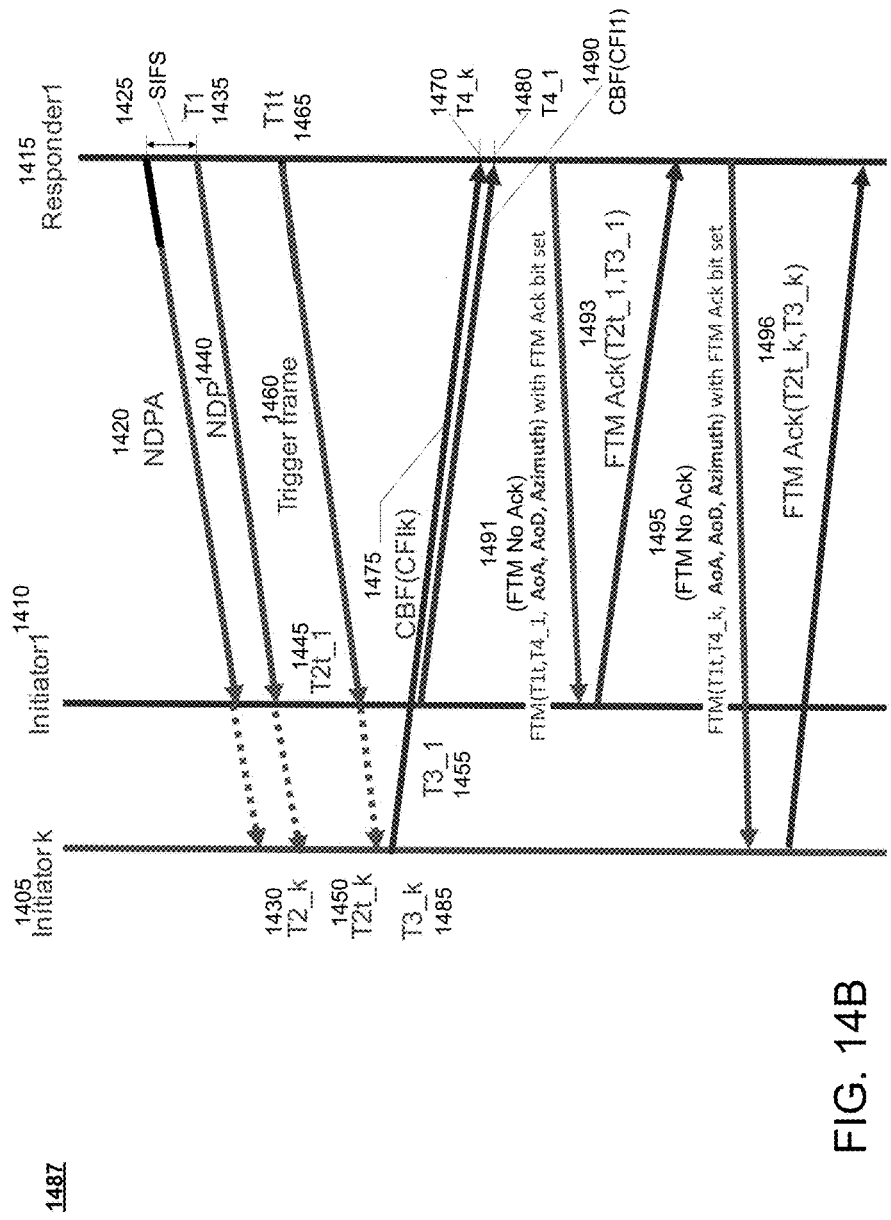
FIG. 14B shows a multicast symmetric Orthogonal Frequency Division Multiple Access (OFDMA) or downlink Multi User MIMO message flow 1487 with multiple initiators where information for all initiators is received within a SIFS interval.

FIG. 14B shows a multicast symmetric Orthogonal Frequency Division Multiple Access (OFDMA) message flow 1487 with multiple initiators where information for all initiators is received within a SIFS interval. FIG. 14B shows some additional message exchanges relative to the message flow depicted in FIG. 14A. Message flows and elements in common with FIG. 14A have been identified with the same reference numerals that were used in FIG. 14A.

In FIG. 14B, the Responder shares information (e.g. a bit in Reserved subfield 432 in FIG. 4B may be set). In FIG. 14B, OFDMA is used and synchronization between initiators and responders may be facilitated by exchanges of information and/or frames between initiators and responders. In contrast, some schemes, which respond to a multi-user NDP frame from an AP using time multiplexed responses by responders, may fail to maintain adequate synchronization because of a lack of transmissions by the AP.

As shown in FIG. 14B, NDPA frame 1420 (e.g. with broadcast bit in Reserved subfield 432 set to 1) may be sent by Responder 1 1415. NDPA frame 1420 may be received by Initiator 1 1410 through Initiators k 1405

NDPA frame 1320 may be followed by transmission (by Responder 1 1415) of NDP frame 1440 at time T1 1425 after a time interval given by SIFS measured from the end of transmission of NDPA frame 1420. NDP Frame 1440 may be received by Initiators k at times given by T2_1, T2_2, . . . T2_k, respectively.

After a SIFS interval from the end of transmission of NDP frame 1440, Trigger frame 1460 may be transmitted by Responder 1 1415 at time T1t 1465 and received by Initiators k at times given by T2t_1 1445, T2t_2, . . . T2t_k 1450, respectively.

After a SIFS interval from the end of reception of trigger frame 1460, CBF frames CBF(CFI1) 1490, CBF (CFI2), . . . CBF(CFI_k) 1475 may be transmitted at times t3_1 1455, t3_2, . . . t3_k 1485. The CBF frames are received by Responder 1 1415 at times T4_1 1480, T4_2, . . . T4_k 1470. In some embodiments, the CBF frames may be multiplexed using OFDMA or uplink multi-user MIMO (UL MU-MIMO).

Responder 1 1415 transmits FTM No Ack frame 1491 with time T1t 1465, T4_1 1480, AoA, AoD, Azimuth to Initiator 1 1410 with FTM Ack bit set. Initiator 1415 responds with FTM Ack frame 1493 with time T2t,_1 1445 and time T3_1 1455.

Similarly, Responder 1 1415 may transmits FTM No Ack frame 1495 with time T1t 1465, T4_k 1470, AoA, AoD, Azimuth to Initiator k 1405 with FTM Ack bit set. Initiator k 1405 responds with FTM Ack frame 1496 with time T2t,_k 1450 and time T3_k 1485. Round trip time for the $k^{th}$ initiator RTT_k may be computed as: (T4_k−T1t)−(T3_k−T2_k) by both Initiators and Responders.

In some embodiments, the message flows shown in FIGS. 5A, 5B, 5E, 6, 7A, 9A, 9B, and 9C, and 10-15 may be used based on capability information received from a communicating device indicating support for one or more protocols in the figures.

FIG. 15 shows an example flowchart illustrating a method 1500 for message flow between an initiator (e.g. a first STA) and responder (one or more second STAs/UEs) in accordance with certain embodiments presented herein.

In some embodiments, method 1500 may comprise, in block 1510 broadcasting, from a first STA, at a first time, a first NDPA frame to a plurality of second stations (STAs), the first NDPA frame comprising a first bit indicating that one or more subsequent frames comprise ranging or angular information.

In block 1520, the first STA may broadcast, after a Short Interval Frame Space (SIFS) time interval from the first time, a second frame to the plurality of second station (STAs), wherein the second frame is one of: a Null Data Packet az (NDP_az) frame with information about a time of transmission of the NDP_az frame, or a Null Data Packet (NDP) frame.

In block 1530, the first STA may receive, in response to the second frame, a plurality of Compressed Beamforming (CBF) frames. Each CBF frame in the plurality of CBF frames may be received from a distinct corresponding second STA in the plurality of second STAs. Further, each CBF frame may include a corresponding Channel Feedback Information (CFI) field with information pertaining to communication channel between the first STA and a corresponding second STA (from which the corresponding CBF frame is received).

In some embodiments, the plurality of CBF frames may be received in response to a trigger frame, and encoded using Orthogonal Frequency Division Multiple Access, (OFDMA). In some embodiments, method 1500 may comprise: broadcasting the trigger frame to the plurality of second STAs subsequent to the broadcast of the second frame. The trigger frame may trigger the transmission of the CBF frames from the second STAs, which are then received by the first STA. In some embodiments, for example, when OFDMA is used, the plurality of CBF frames may be received within a Short Interval Frame Space (SIFS) time interval of reception of a first CBF frame of the plurality of CBF frames.

In some embodiments, channel parameters may be determined for each CBF frame in some subset of the received CBF frames based, in part, on information in the CFI field of each CBF frame. For example, based, in part, on information in the CFI field of a CBF frame received from a corresponding second STA, one or more of: an Angle of Arrival (AoA) of the corresponding CBF frame, or an Angle of Departure (AoD) of the corresponding CBF frame, or azimuth information pertaining to a corresponding second STA (from which the corresponding CBF frame was received), may be determined.

In some embodiments, in response to each CBF frame in the subset, a corresponding FTM frame may be transmitted to the corresponding second STA. Each corresponding FTM frame may comprise an acknowledgment response bit indicating that a response to the corresponding FTM frame may be sent as an FTM Acknowledgment (FTM Ack) frame. Each corresponding FTM frame may further comprise: a time of arrival of the corresponding CBF frame from the corresponding second STA, and a time of transmission of the trigger frame by the first STA. In addition, each corresponding FTM frame may include one or more of: the AoA of the corresponding CBF frame, or the AoD of the corresponding CBF frame, or the azimuth information pertaining to the corresponding second STA.

In some embodiments, in response to each corresponding FTM frame in some subset of the transmitted FTM frames, corresponding FTM Acknowledgement (FTM Ack) frames may be received from a corresponding second STA. Each FTM Ack frame received from a corresponding second STA may comprise: a time of arrival of the trigger frame at the corresponding second STA; and a time of transmission of the corresponding CBF frame from the corresponding second STA to the first STA. The corresponding CBF frame is one of the plurality of CBF frames received by the first STA.

In some embodiments, a first CBF frame in the plurality of CBF frames received by the first STA may be received from an initial corresponding second STA within a Short Interval Frame Space (SIFS) time interval from a time of transmission of the second frame. Each subsequent CBF frame in the plurality of CBF frames may then be received from a subsequent corresponding second STA after a SIFS time interval of reception of a preceding CBF frame in the plurality of CBF frames. For example, after reception of the first CBF frame, the second CBF frame may be received after a SIFS interval from a time of reception of the first CBF frame, a third CBF frame may be received after a SIFS interval from a time of reception of the second CBF frame and so on.

In some embodiments, in block 1530, receiving the plurality of CBF frames may comprise: receiving an initial CBF frame in the plurality of CBF frames from an initial corresponding second STA in the plurality of second STAs. Upon reception of the initial CBF frame, one or more Beamforming Report Poll (BRP) frames may be transmitted. Each BRP frame may comprises a corresponding Basic Service Set Identifier (BSS ID) associated with a subsequent corresponding second STA (different from the initial corresponding second STA) in the plurality of second STAs. Further, in response to each BRP frame, a corresponding subsequent CBF frame may be received from the subsequent corresponding second STA. The plurality of CBF frames received by the first STA include the initial CBF frame and the corresponding subsequent CBF frames.

Further, in some embodiments, FTM and FTM Acknowledgement frames may be exchanged between the first STA on one hand, and the initial corresponding second STA and subsequent corresponding second STAs. For example, a first FTM frame with a time of arrival of the second frame at the initial corresponding second STA, and a time of transmission of the initial CBF frame may be received from the initial corresponding second STA. Further, corresponding second FTM frames may be received from each subsequent corresponding second STA. Each corresponding FTM frame may include a time of arrival of the second frame at the subsequent corresponding second STA, and a time of transmission of a corresponding subsequent CBF frame from the corresponding second STA. Further, the first FTM frame and each second FTM frame may include an acknowledgment response bit indicating that a response may be sent as an FTM Acknowledgment (FTM Ack) frame.

In some embodiments, an FTM Ack frame may be received in response to the transmitted FTM frame. For example, in response to a corresponding first FTM frame, a first FTM Ack frame may be received comprising: a time of transmission of the second frame, and a time of arrival of the initial CBF frame. Further, in response to each corresponding second FTM frame, a corresponding second FTM Ack frame may be received at the first STA comprising: a time of transmission of the second frame, and a time of arrival of the corresponding subsequent CBF frame.

The method disclosed above may be performed by STA 100 (e.g. APs and/or UEs) and/or embodied on computer-readable media and executed by a processor on STA 100. Although the disclosure is illustrated in connection with specific embodiments for instructional purposes, embodiments are not limited thereto. Various adaptations and modifications may be made without departing from the scope. Therefore, the spirit and scope of the appended claims should not be limited to the foregoing description.

What is claimed is:

1. A method on a first station (STA) comprising:
   broadcasting, at a first time, a first Null Data packet Announcement (NDPA) frame to a plurality of second stations (STAs), the first NDPA frame comprising a first bit indicating that an immediately subsequent second frame is to be used for ranging;
   broadcasting, after a Short Interval Frame Space (SIFS) time interval from the first time, the second frame to the plurality of second station (STAs), wherein the second frame is one of:
      a Null Data Packet az (NDP_az) frame with information about a time of transmission of the NDP_az frame, or
      a Null Data Packet (NDP) frame; and
   receiving, at the first STA, in response to the second frame or a trigger frame, a plurality of Compressed Beamforming (CBF) frames, wherein each CBF frame in the plurality of CBF frames is:
      received from a distinct corresponding second STA in the plurality of second STAs, and
      comprises a corresponding Channel Feedback Information (CFI) field with information pertaining to a communication channel between the first STA and the corresponding second STA.

2. The method of claim 1, wherein, receiving the plurality of CBF frames comprises:
   broadcasting the trigger frame to the plurality of second STAs, the trigger frame being broadcast subsequent to the broadcast of the second frame; and
   receiving, in response to the trigger frame, the plurality of CBF frames encoded using Orthogonal Frequency Division Multiple Access (OFDMA).

3. The method of claim 2, further comprising:
   determining, for each CBF frame in a subset of the plurality of CBF frames, based, in part, on the corresponding CFI field, one or more of:
      an Angle of Arrival (AoA) of the corresponding CBF frame, or
      an Angle of Departure (AoD) of the corresponding CBF frame, or
      azimuth information pertaining to a corresponding second STA from which the corresponding CBF frame was received.

4. The method of claim 3, further comprising:
   transmitting, in response to each CBF frame in the subset of the plurality of CBF frames, a corresponding Fine Timing Measurement (FTM) frame to the corresponding second STA, wherein the corresponding FTM frame comprises an acknowledgment response bit, the acknowledgment response bit indicating that a response to the corresponding FTM frame may be sent as an FTM Acknowledgment (FTM Ack) frame, wherein the corresponding FTM frame further comprises:
      a time of arrival of the corresponding CBF frame from the corresponding second STA, and
      a time of transmission of the trigger frame; and
   one or more of:
      the AoA of the corresponding CBF frame, or
      the AoD of the corresponding CBF frame, or
      the azimuth information pertaining to the corresponding second STA.

5. The method of claim 4, further comprising:
   receiving, in response to each corresponding FTM frame in a subset of the transmitted FTM frames, an FTM Acknowledgement (FTM Ack) frame from the corresponding second STA, the FTM Ack frame comprising:
      a time of arrival of the trigger frame at the corresponding second STA; and
      a time of transmission of the corresponding CBF frame from the corresponding second STA, wherein the corresponding CBF frame is comprised in the plurality of CBF frames received by the first STA.

6. The method of claim 2, wherein the plurality of CBF frames are received within a Short Interval Frame Space (SIFS) time interval of reception of a first CBF frame of the plurality of CBF frames.

7. The method of claim 1, wherein:
   a first CBF frame in the plurality of CBF frames is received from an initial corresponding second STA, the first CBF frame being transmitted within a Short Interval Frame Space (SIFS) time interval from a time of reception of the second frame; and
   each subsequent CBF frame in the plurality of CBF frames is received from a subsequent corresponding second STA, each subsequent CBF frame being transmitted after a SIFS time interval of transmission of a preceding CBF frame in the plurality of CBF frames.

8. The method of claim 1, wherein receiving the plurality of CBF frames comprises:
   receiving an initial CBF frame in the plurality of CBF frames from an initial corresponding second STA in the plurality of second STAs;
   transmitting, upon reception of the initial CBF frame, one or more Beamforming Report Poll (BRP) frames, wherein each BRP frame comprises a corresponding Basic Service Set Identifier (BSS ID) associated with a subsequent corresponding second STA in the plurality of second STAs; and
   receiving, in response to each BRP frame, a corresponding subsequent CBF frame from the subsequent corresponding second STA, wherein the plurality of CBF frames comprise the corresponding subsequent CBF frame.

9. The method of claim 8, further comprising:
   receiving, from the initial corresponding second STA, a corresponding first FTM frame comprising: a time of arrival of the second frame at the initial corresponding second STA, and a time of transmission of the initial CBF frame; and receiving, from each subsequent corresponding second STA, a corresponding second FTM frame comprising:
a time of arrival of the second frame at the subsequent corresponding second STA, and a time of transmission of the corresponding subsequent CBF frame; and
wherein the first FTM frame and each second FTM frame comprise an acknowledgment response bit, the acknowledgment response bit indicating that a response may be sent as an FTM Acknowledgment (FTM Ack) frame.

10. The method of claim 9, further comprising:
transmitting, in response to the corresponding first FTM frame, a first FTM Ack frame comprising: a time of transmission of the second frame, and a time of arrival of the initial CBF frame; and
transmitting, in response to each corresponding second FTM frame, a corresponding second FTM Ack frame comprising: a time of transmission of the second frame, and a time of arrival of the corresponding subsequent CBF frame.

11. A first station (STA) comprising:
a memory, and
a processor coupled to the memory, wherein the processor is configured to:
broadcast, at a first time, a first Null Data packet Announcement (NDPA) frame to a plurality of second stations (STAs), the first NDPA frame comprising a first bit indicating that an immediately subsequent second frame is to be used for ranging;
broadcast, after a Short Interval Frame Space (SIFS) time interval from the first time, the second frame to the plurality of second station (STAs), wherein the second frame is one of:
a Null Data Packet az (NDP_az) frame with information about a time of transmission of the NDP_az frame, or
a Null Data Packet (NDP) frame; and
receive, at the first STA, in response to the second frame or a trigger frame, a plurality of Compressed Beamforming (CBF) frames, wherein each CBF frame in the plurality of CBF frames is:
received from a distinct corresponding second STA in the plurality of second STAs, and
comprises a corresponding Channel Feedback Information (CFI) field with information pertaining to communication channel between the first STA and the corresponding second STA.

12. The first STA of claim 11, wherein to receive the plurality of CBF frames, the processor is configured to:
broadcast, the trigger frame to the plurality of second STAs, the trigger frame being broadcast subsequent to the broadcast of the second frame; and
receive, in response to the trigger frame, the plurality of CBF frames encoded using Orthogonal Frequency Division Multiple Access (OFDMA).

13. The first STA of claim 12, wherein the processor is further configured to:
determine, for each CBF frame in a subset of the plurality of CBF frames, based, in part, on the corresponding CFI field, one or more of:
an Angle of Arrival (AoA) of the corresponding CBF frame, or
an Angle of Departure (AoD) of the corresponding CBF frame, or
azimuth information pertaining to a corresponding second STA from which the corresponding CBF frame was received.

14. The first STA of claim 13, wherein the processor is further configured to:
transmit, in response to each CBF frame in the subset of the plurality of CBF frames, a corresponding Fine Timing Measurement (FTM) frame to the corresponding second STA, wherein the corresponding FTM frame comprises an acknowledgment response bit, the acknowledgment response bit indicating that a response to the corresponding FTM frame may be sent as an FTM Acknowledgment (FTM Ack) frame, wherein the corresponding FTM frame further comprises:
a time of arrival of the corresponding CBF frame from the corresponding second STA, and
a time of transmission of the trigger frame; and
one or more of:
the AoA of the corresponding CBF frame, or
the AoD of the corresponding CBF frame, or
the azimuth information pertaining to the corresponding second STA.

15. The first STA of claim 14, wherein the processor is further configured to:
receive, in response to each corresponding FTM frame in a subset of the transmitted FTM frames, an FTM Acknowledgement (FTM Ack) frame from the corresponding second STA, the FTM Ack frame comprising:
a time of arrival of the trigger frame at the corresponding second STA; and
a time of transmission of the corresponding CBF frame from the corresponding second STA, wherein the corresponding CBF frame is comprised in the plurality of CBF frames received by the first STA.

16. The first STA of claim 12, wherein the plurality of CBF frames are received within a Short Interval Frame Space (STS) time interval of reception of a first CBF frame of the plurality of CBF frames.

17. The first STA of claim 11, wherein:
a first CBF frame in the plurality of CBF frames is received from an initial corresponding second STA, the first CBF frame being transmitted within a Short Interval Frame Space (SIFS) time interval from a time of reception of the second frame; and
each subsequent CBF frame in the plurality of CBF frames is received from a subsequent corresponding second STA, each subsequent CBF frame being transmitted after a SIFS time interval of transmission of a preceding CBF frame in the plurality of CBF frames.

18. The first STA of claim 11, wherein to receive the plurality of CBF frames, the processor is configured to:
receive an initial CBF frame in the plurality of CBF frames from an initial corresponding second STA in the plurality of second STAs;
transmit, upon reception of the initial CBF frame, one or more Beamforming Report Poll (BRP) frames, wherein each BRP frame comprises a corresponding Basic Service Set Identifier (BSS ID) associated with a subsequent corresponding second STA in the plurality of second STAs; and
receive, in response to each BRP frame, a corresponding subsequent CBF frame from the subsequent corresponding second STA, wherein the plurality of CBF frames comprise the corresponding subsequent CBF frame.

19. The first STA of claim 18, wherein the processor is further configured to:
receive, from the initial corresponding second STA, a corresponding first FTM frame comprising: a time of arrival of the second frame at the initial corresponding second STA, and a time of transmission of the initial CBF frame; and receive, from each subsequent corresponding second STA, a corresponding second FTM frame comprising: a time of arrival of the second frame at the subsequent corresponding second STA, and a time of transmission of the corresponding subsequent CBF frame; and wherein the first FTM frame and each second FTM frame comprise an acknowledgment response bit, the acknowledgment response bit indicating that a response may be sent as an FTM Acknowledgment (FTM Ack) frame.

20. The first STA of claim 19, further comprising:

transmitting, in response to the corresponding first FTM frame, a first FTM Ack frame comprising: a time of transmission of the second frame, and a time of arrival of the initial CBF frame; and transmitting, in response to each corresponding second FTM frame, a corresponding second FTM Ack frame comprising: a time of transmission of the second frame, and a time of arrival of the corresponding subsequent CBF frame.

21. A first station (STA) comprising:

means for broadcasting, at a first time, a first Null Data packet Announcement (NDPA) frame to a plurality of second stations (STAs), the first NDPA frame comprising a first bit indicating that an immediately subsequent second frame is to be used for ranging;

means for broadcasting, after a Short Interval Frame Space (SIFS) time interval from the first time, the second frame to the plurality of second station (STAs), wherein the second frame is one of:
  a Null Data Packet az (NDP_az) frame with information about a time of transmission of the NDP_az frame, or
  a Null Data Packet (NDP) frame; and means for receiving, at the first STA, in response to the second frame or a trigger frame, a plurality of Compressed Beamforming (CBF) frames, wherein each CBF frame in the plurality of CBF frames is:
  received from a distinct corresponding second STA in the plurality of second STAs, and
  comprises a corresponding Channel Feedback Information (CFI) field with information pertaining to communication channel between the first STA and the corresponding second STA.

22. The first STA of claim 21, further comprising:
means for broadcasting the trigger frame to the plurality of second STAs, the trigger frame being broadcast subsequent to the broadcast of the second frame; and
wherein, means for receiving the plurality of CBF frames comprises:
  means for receiving, in response to the trigger frame, the plurality of CBF frames encoded using Orthogonal Frequency Division Multiple Access (OFDMA).

23. The first STA of claim 22, further comprising:
means for determining, for each CBF frame in a subset of the plurality of CBF frames, based, in part, on the corresponding CFI field, one or more of:
  an Angle of Arrival (AoA) of the corresponding CBF frame, or
  an Angle of Departure (AoD) of the corresponding CBF frame, or
  azimuth information pertaining to a corresponding second STA from which the corresponding CBF frame was received.

24. The first STA of claim 21, wherein:
a first CBF frame in the plurality of CBF frames is received from an initial corresponding second STA, the first CBF frame being transmitted within a Short Interval Frame Space (SIFS) time interval from a time of transmission of the second frame; and
each subsequent CBF frame in the plurality of CBF frames is received from a subsequent corresponding second STA, each subsequent CBF frame being transmitted after a SIFS time interval of transmission of a preceding CBF frame in the plurality of CBF frames.

25. The first STA of claim 21, wherein means for receiving the
plurality of CBF frames comprises:
means for receiving an initial CBF frame in the plurality of CBF frames from an initial corresponding second STA in the plurality of second STAs;
means for transmitting, upon reception of the initial CBF frame, one or more Beamforming Report Poll (BRP) frames, wherein each BRP frame comprises a corresponding Basic Service Set Identifier (BSS ID) associated with a subsequent corresponding second STA in the plurality of second STAs; and
means for receiving, in response to each BRP frame, a corresponding subsequent CBF frame from the subsequent corresponding second STA, wherein the plurality of CBF frames comprise the corresponding subsequent CBF frame.

26. A non-transitory computer-readable medium comprising
code executable by a processor to:
broadcast, at a first time, a first Null Data packet Announcement (NDPA) frame to a plurality of second stations (STAs), the first NDPA frame comprising a first bit indicating that an immediately subsequent second frame is to be used for ranging;
broadcast, after a Short Interval Frame Space (SIFS) time interval from the first time, the second frame to the plurality of second station (STAs), wherein the second frame is one of:
  a Null Data Packet az (NDP_az) frame with information about a time of transmission of the NDP_az frame, or
  a Null Data Packet (NDP) frame; and
receive, at the first STA, in response to the second frame or a trigger frame, a plurality of Compressed Beamforming (CBF) frames, wherein each CBF frame in the plurality of CBF frames is:
  received from a distinct corresponding second STA in the plurality of second STAs, and
  comprises a corresponding Channel Feedback Information (CFI) field with information pertaining to communication channel between the first STA and the corresponding second STA.

27. The computer-readable medium of claim 26, wherein the code to receive the plurality of CBF frames comprises code executable by the processor to:
broadcast, the trigger frame to the plurality of second STAs, the trigger frame being broadcast subsequent to the broadcast of the second frame; and
receive, in response to the trigger frame, the plurality of CBF frames, the trigger frames being encoded using Orthogonal Frequency Division Multiple Access (OFDMA).

28. The computer-readable medium of claim 27, further comprising code executable by the processor to:

determine, for each CBF frame in a subset of the plurality of CBF frames, based, in part, on the corresponding CFI field, one or more of:
- an Angle of Arrival (AoA) of the corresponding CBF frame, or
- an Angle of Departure (AoD) of the corresponding CBF frame, or
- azimuth information pertaining to a corresponding second STA from which the corresponding CBF frame was received.

29. The computer-readable medium of claim 26, wherein
a first CBF frame in the plurality of CBF frames is received from an initial corresponding second STA, the first CBF frame being transmitted within a Short Interval Frame Space (SIFS) time interval from a time of transmission of the second frame; and each subsequent CBF frame in the plurality of CBF frames is received from a subsequent corresponding second STA, each subsequent CBF frame being transmitted after a SIFS time interval of transmission of a preceding CBF frame in the plurality of CBF frames.

30. The computer-readable medium of claim 26, wherein to receive the plurality of CBF frames, the medium further comprises code executable by the processor to:
- receive an initial CBF frame in the plurality of CBF frames from an initial corresponding second STA in the plurality of second STAs;
- transmit, upon reception of the initial CBF frame, one or more Beamforming Report Poll (BRP) frames, wherein each BRP frame comprises a corresponding Basic Service Set Identifier (BSS ID) associated with a subsequent corresponding second STA in the plurality of second STAs; and
- receive, in response to each BRP frame, a corresponding subsequent CBF frame from the subsequent corresponding second STA, wherein the plurality of CBF frames comprise the corresponding subsequent CBF frame.

* * * * *